(12) United States Patent
Hettinger

(10) Patent No.: US 7,908,169 B2
(45) Date of Patent: *Mar. 15, 2011

(54) METHOD OF LEASING A GAMING MACHINE FOR A PERCENTAGE OF A TOTAL COIN-IN AMOUNT

(75) Inventor: Mark Hettinger, Reno, NV (US)

(73) Assignee: IGT, Reno, NV (US)

( * ) Notice: Subject to any disclaimer, the term of this patent is extended or adjusted under 35 U.S.C. 154(b) by 1517 days.

This patent is subject to a terminal disclaimer.

(21) Appl. No.: 11/042,388

(22) Filed: Jan. 25, 2005

(65) Prior Publication Data

US 2006/0167707 A1  Jul. 27, 2006

(51) Int. Cl.
G06Q 30/00 (2006.01)
A63F 9/24 (2006.01)

(52) U.S. Cl. ............. 705/14.12; 705/1; 705/14; 705/16; 705/35; 463/12; 463/16; 463/25; 463/27; 463/28; 194/346

(58) Field of Classification Search .................. 194/346; 463/12, 16, 25, 27, 28; 705/1, 14, 16, 35
See application file for complete search history.

(56) References Cited

U.S. PATENT DOCUMENTS

| | | | | |
|---|---|---|---|---|
| 3,262,539 | A | * | 7/1966 | Neubacher et al. ........... 194/346 |
| 5,275,400 | A | * | 1/1994 | Weingardt et al. ............. 463/12 |
| 5,470,079 | A | | 11/1995 | LeStrange et al. |
| 5,620,182 | A | | 4/1997 | Rossides |
| 5,766,076 | A | | 6/1998 | Pease et al. |
| 5,794,207 | A | | 8/1998 | Walker et al. |
| 5,970,470 | A | | 10/1999 | Walker et al. |
| 5,984,779 | A | * | 11/1999 | Bridgeman et al. ............ 463/16 |
| 6,039,648 | A | * | 3/2000 | Guinn et al. .................... 463/16 |
| 6,055,314 | A | | 4/2000 | Spies et al. |
| 6,102,799 | A | * | 8/2000 | Stupak ............................ 463/27 |
| 6,249,772 | B1 | | 6/2001 | Walker et al. |
| 6,324,520 | B1 | * | 11/2001 | Walker et al. ................... 705/16 |
| 6,584,450 | B1 | | 6/2003 | Hastings et al. |
| 6,634,946 | B1 | * | 10/2003 | Bridgeman et al. ........... 463/28 |
| 7,302,412 | B1 | | 11/2007 | Speck |
| 2002/0116208 | A1 | * | 8/2002 | Chirnomas ...................... 705/1 |
| 2003/0027629 | A1 | * | 2/2003 | Pimienta ......................... 463/25 |
| 2003/0055663 | A1 | * | 3/2003 | Struble ............................. 705/1 |
| 2003/0083122 | A1 | | 5/2003 | Beaulieu |
| 2003/0135380 | A1 | | 7/2003 | Lehr et al. |
| 2003/0225643 | A1 | | 12/2003 | Kakoschke |
| 2004/0054551 | A1 | | 3/2004 | Ausubel et al. |

(Continued)

OTHER PUBLICATIONS

Cary Spivak et al., Potawatomi slots hit the jackpot for owners, Milwaukee Journal Sentinel, Feb. 18, 1996, p. 1 (ProQuest document ID 56861896, and referred to herein as ProQuest '896).*

(Continued)

*Primary Examiner* — Shahid R Merchant
*Assistant Examiner* — B. Joan Amelunxen
(74) *Attorney, Agent, or Firm* — K&L Gates LLP

(57) ABSTRACT

A method of leasing a gaming machine is provided that includes determining a monetary average machine net win in monetary units per gaming machine per unit of time for a group of existing gaming machines, receiving the leased gaming machine, and determining a monetary payment amount for the leased gaming machine for a second time period based on the average machine net win, the monetary payment amount equaling a percentage of a total coin-in amount wagered at a new leased gaming machine.

9 Claims, 21 Drawing Sheets

U.S. PATENT DOCUMENTS

| | | | |
|---|---|---|---|
| 2004/0127277 A1* | 7/2004 | Walker et al. | 463/16 |
| 2004/0192434 A1* | 9/2004 | Walker et al. | 463/25 |
| 2004/0249711 A1 | 12/2004 | Walker et al. | |
| 2005/0119045 A1 | 6/2005 | Fujimoto | |
| 2006/0030389 A1* | 2/2006 | Okada | 463/16 |
| 2006/0030402 A1* | 2/2006 | Chandrakumar et al. | 463/25 |
| 2006/0052169 A1 | 3/2006 | Britt et al. | |
| 2006/0166733 A1 | 7/2006 | Hettinger | |
| 2006/0166734 A1 | 7/2006 | Gaites | |
| 2006/0167708 A1 | 7/2006 | Hettinger | |
| 2006/0252516 A1 | 11/2006 | Walker et al. | |
| 2007/0087822 A1 | 4/2007 | Van Luchene | |
| 2008/0040211 A1* | 2/2008 | Walker et al. | 705/14 |

OTHER PUBLICATIONS

Jim Kilby et al., Casino Operations Management, $2^{nd}$ Ed., John Wiley & Sons, Inc., Chapter 7: Slot Management, pp. 107-140, Mar. 2004 (referred to herein as "Casino Operations").*

Gaming Machine Act 1991, Reprint No. 6A, Queensland Parliamentary Counsel, State of Queensland (includes commenced amendments up to 2003 Act No. 41), Jul. 1, 2003.*

Jim Kilby et al., Casino Operations Management, 2nd Ed., John Wiley & Sons, Inc., Chapter 7: Slot Management, pp. 107-140, Mar. 2004 (and referred to herein as "Casino Operations").*

Gaming Machine Act 1991, Reprint No. 6A, Queensland Parliamentary Counsel, State of Queensland (includes commenced amendments up to 2003 Act. No. 41), Jul. 2003.*

Ref. U—K. Gregg. Harrah's opens campaign to thwart BLB deal, Knight Ridder Tribune Business News, Washington: Jul. 12, 2005, pp. 1-3 (ProQuest Doc. ID 865897111).*

PDS Gaming Corporation http://www.casinovendors.com/VendorLinkFrame.aspx?URL=www.pdsgaming.com (1 of 3) Dec. 6, 2007.

Form 10-Q for WMS Industries INC/De/ http://biz.yahoo.com/e/061107wms10-q.html (1 of 10) Dec. 6, 2007.

Interactive Games to Expand National Leasing Program of Slot Machines to Casino Operators in Regulated Jurisdictions http://findarticles.com/p/articles/mi_200503/ai_n13267793/print (1 of 2) Dec. 6, 2007.

Investing in the Slot Machine Industry, by Paul Tracy, http://www.streetauthority.com/cmnts/pt/2006/01-01.asp, (1 of 5) Jan. 1, 2006.

* cited by examiner

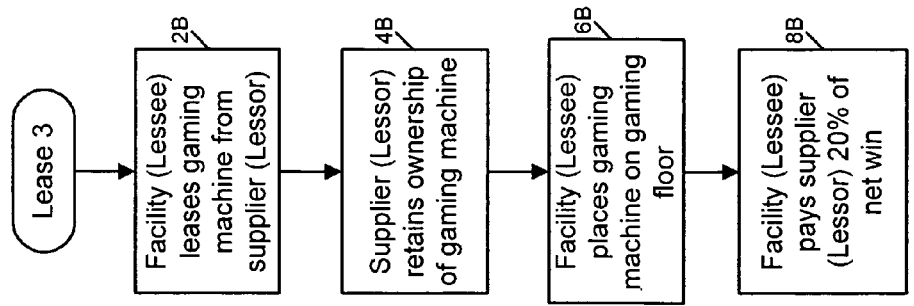
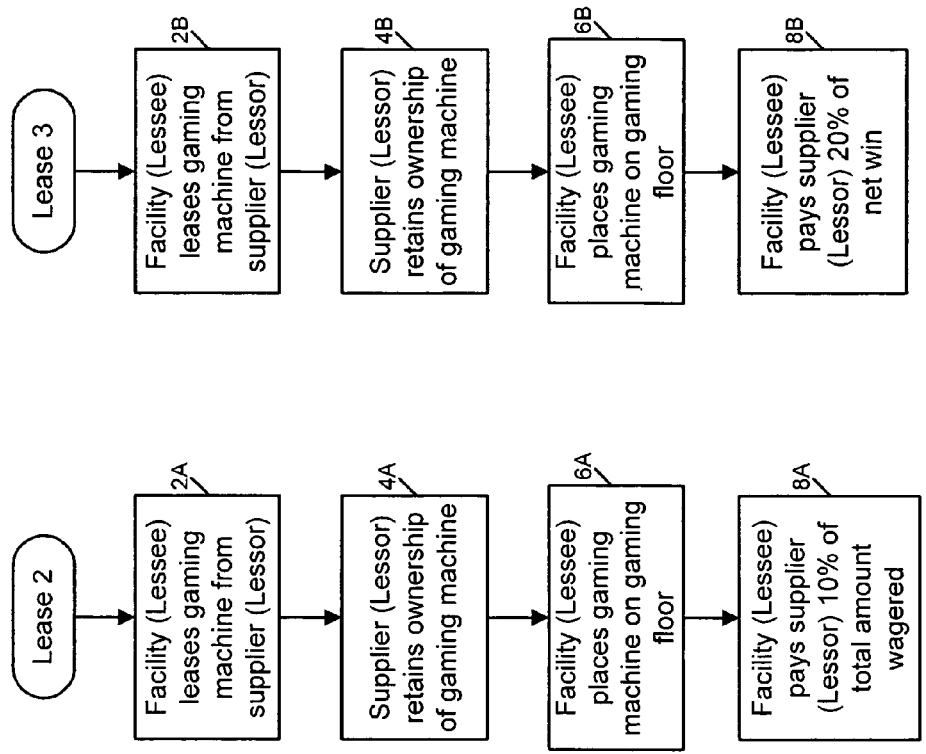
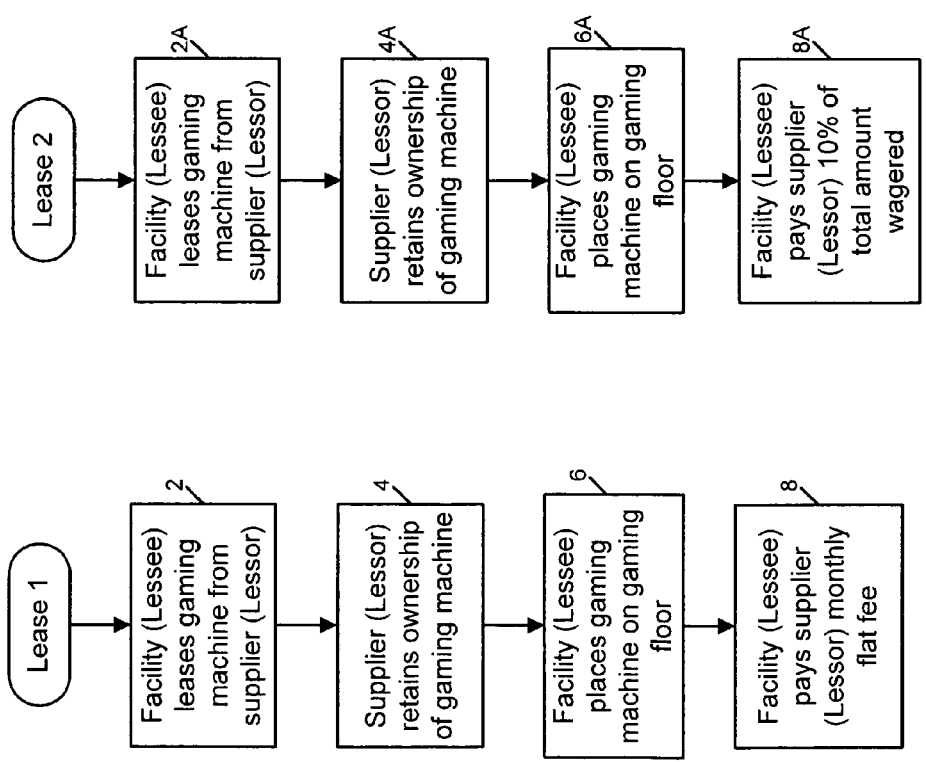

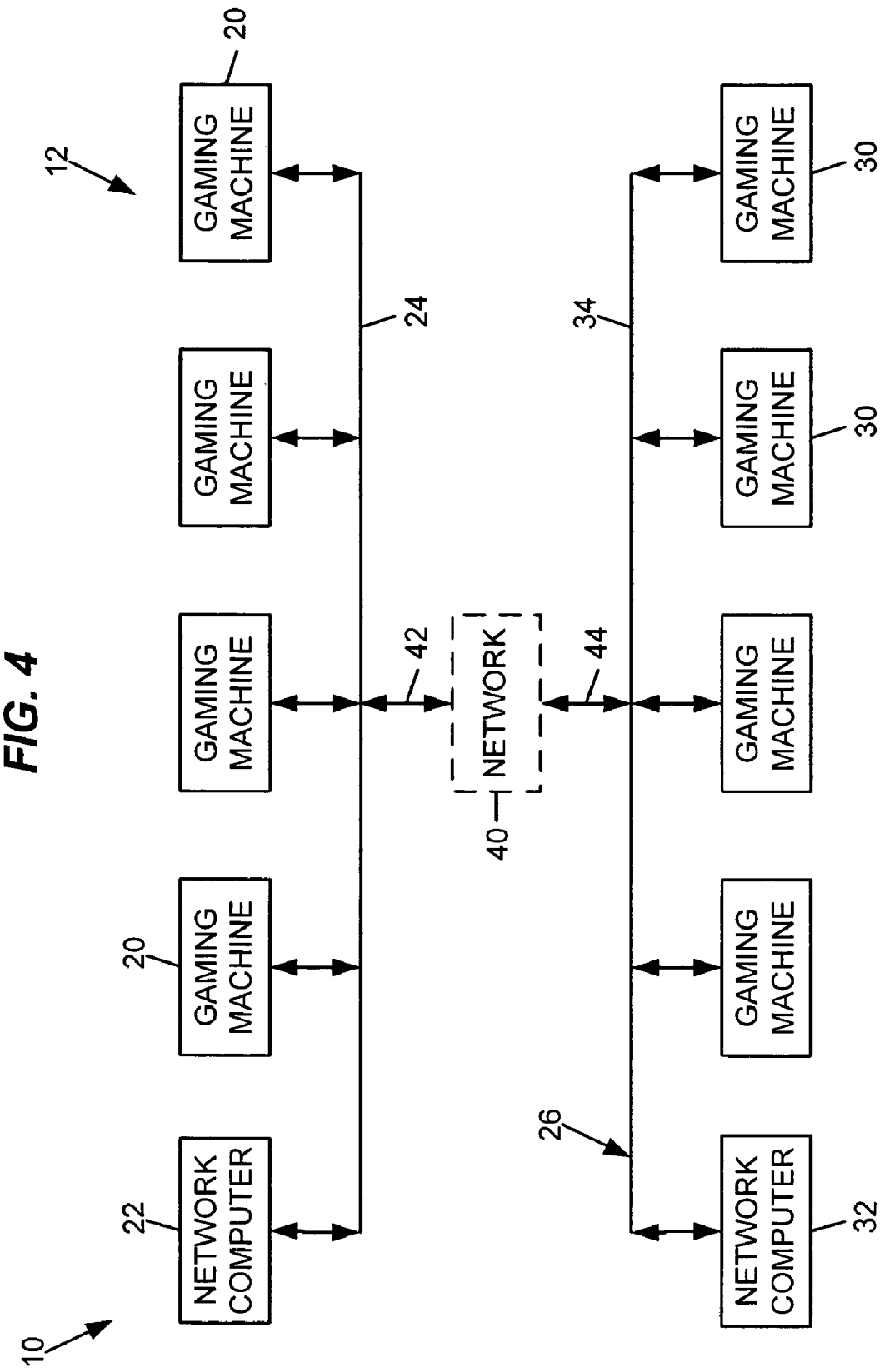

METHOD OF LEASING A GAMING MACHINE FOR A PERCENTAGE OF A TOTAL COIN-IN AMOUNT

CROSS-REFERENCE TO RELATED APPLICATIONS

This application relates to the following co-pending commonly owned patent applications:
"METHOD OF LEASING A GAMING MACHINE FOR A FLAT FEE AMOUNT," Ser. No. 11/042,498; and "METHOD OF LEASING A GAMING MACHINE FOR A PERCENTAGE OF A NET WIN AMOUNT," Ser. No. 11/042,947.

TECHNICAL FIELD

The present description relates generally to financial models for leasing of gaming machines. More specifically, the present description relates to reverse lease methods for leasing gaming machines for a percentage of a total coin-in amount.

BACKGROUND

Gaming establishments are continually searching for new gaming systems to attract new players and hold the attention of existing players. By developing new games, the gaming establishments hope to pique existing players' interests in continued wagering and to attract new players. If players lose interest in a gaming machine, they typically will stop playing that game, which causes the gaming machine to be idle and not contribute to the revenue of the casino. In addition, interested players may tend to be more active and consistent in the play of their respective machines and consequently tend to play faster, thus enhancing the potential profit of the machine.

To keep and increase players' interest in gaming, the gaming industry has traditionally instituted a relatively short replacement cycle for its gaming machines so that the latest games and software are present on the gaming machines sitting on the facilities' floors. This requirement, coupled with the large capital expenditures necessary to acquire gaming machines, creates an environment in which gaming facilities, such as casinos, bear nearly all of the risk associated with purchasing gaming machines. Thus, gaming facilities cannot afford to have financially unproductive gaming machines sitting on their floors with outdated gaming content. Therefore, gaming facilities appreciate financial models that allow them to replace groups of unproductive gaming machines without risk and ensure that their profitability will increase for those replaced gaming machines.

FIGS. 1-3 illustrate three prior art method of leasing gaming machines. These lease methods include leasing a gaming machine for a supplier (blocks 2, 2A, 2B), wherein the supplier retains ownership of the new leased gaming machine (blocks 4, 4A, 4B). The facility then disposes the gaming machine on the gaming floor (blocks 6, 6A, 6B). In the first lease method shown in FIG. 1, the facility then pays the supplier a monthly fixed flat fee (block 8). In the second lease method shown in FIG. 2, without taking into account any other factors, the facility then pays the supplier a fixed percentage of the total amount wagered at the new gaming machine (block 8A). In the third lease method shown in FIG. 3, without taking into account any other factors, the facility pays the supplier a fixed percentage of the net win for the new gaming machine (block 8B).

SUMMARY OF THE INVENTION

In one aspect, the invention is directed to a method of leasing a casino gaming machine from a casino gaming machine supplier for placement on a gaming floor of a casino, where the method includes determining a monetary average machine net win in monetary units per casino gaming machine per unit of time for a group of existing casino gaming machines located on the gaming floor of the casino. The monetary average machine net win being calculated by dividing a total net win amount for a first time period at all of the existing casino gaming machines in the group by the total number of the existing casino gaming machines in the group of casino gaming machines, the total net win amount equaling a total coin-in amount for all of the existing casino gaming machines in the group minus a total paid out amount for all of the existing casino gaming machines in the group and minus any amounts escrowed for a future jackpot or award. The group of existing gaming machines being defined based on a characteristic associated with each of the gaming machines in the group.

The method also includes receiving the leased casino gaming machine from the casino gaming machine supplier, the leased casino gaming machine having a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

Also included is placing the leased casino gaming machine at the casino, and determining a monetary payment amount for the leased casino gaming machine for a second time period based on the average machine net win, the monetary payment amount equaling a percentage of a total coin-in amount at the leased casino gaming machine over the second time period, the percentage being less than 10% and greater than 0.1%. The method also includes paying the monetary payment amount to the casino gaming machine supplier for the leased casino gaming machine if the monetary payment amount is determined to be greater than zero.

In another aspect, the invention is directed to a method of leasing a gaming machine from a gaming machine supplier for placement at a facility. The method includes determining a monetary average machine net win in monetary units per gaming machine per unit of time for a group of existing gaming machines located at the facility. The monetary average machine net win being calculated by dividing a total net win amount for a first time period at all of the existing gaming machines in the group by the total number of the existing gaming machines in the group of gaming machines. The total net win amount equaling a total coin-in amount for all of the existing gaming machines in the group minus a total paid out amount for all of the existing gaming machines in the group and minus any amounts escrowed for a future jackpot or award.

The method also includes receiving the leased gaming machine from the gaming machine supplier. The leased gaming machine having a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

Also included is determining a monetary payment amount for the leased gaming machine for a second time period. The monetary payment amount equaling a percentage of a total coin-in amount at the leased gaming machine over the second time period, the percentage being less than 10% and greater than 0.1%, and paying the monetary payment amount to the gaming machine supplier for the leased gaming machine if the monetary payment amount is greater than zero.

In yet another aspect, the invention is directed to a method of leasing a casino gaming machine to a casino for placement on a gaming floor of the casino. The method includes receiving from the casino information relating to a monetary average machine net win in monetary units per casino gaming machine per unit of time for a group of existing casino gaming machines located on the gaming floor of the casino. The monetary average machine net win being calculated by dividing a total net win amount for a first time period at all of the existing casino gaming machines in the group by the total number of the existing casino gaming machines in the group of casino gaming machines. The total net win amount equaling a total coin-in amount for all of the existing casino gaming machines in the group minus a total paid out amount for all of the existing casino gaming machines in the group and minus any amounts escrowed for a future jackpot or award.

The method also includes negotiating a lease percentage to be taken of a total coin-in amount at the leased casino gaming machine over a second time period, the negotiated percentage being based on the monetary average machine net win and the percentage being less than 10% and greater than 0.1%. Also included is leasing the leased casino gaming machine to the casino, the leased gaming machine having a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

Also included is receiving from the casino a monetary payment amount for the second time period in exchange for leasing the leased casino gaming machine, the monetary payment amount equaling the percentage of the total coin-in amount for the leased casino gaming machine.

In yet another aspect, the invention is directed to a method of leasing a space on a gaming floor of a casino for placement of a new casino gaming machine that includes determining a monetary average machine net win in monetary units per casino gaming machine per unit of time for a group of existing casino gaming machines located on the gaming floor of the casino that includes the space on the gaming floor. The monetary average machine net win being calculated by dividing a total net win amount for a first time period at all of the existing casino gaming machines in the group by the total number of the existing casino gaming machines in the group of casino gaming machines. The total net win amount equaling a total coin-in amount for all of the existing casino gaming machines in the group minus a total paid out amount for all of the existing casino gaming machines in the group and minus any amounts escrowed for a future jackpot or award.

The method also includes negotiating a lease percentage to be taken of a total coin-in amount at the new machine over a second time period, the new machine being placed at the space on the gaming floor of the casino for the second time period, the negotiated percentage being based on the monetary average machine net win. The new casino gaming machine includes a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

Additionally, the method includes receiving at least a portion of electronic funds wagered at the new casino gaming machine over a second time period and determining a monetary payment amount for the space on the gaming floor of the casino for the second time period. The monetary payment amount equaling the percentage of the total coin-in amount at the new gaming machine over the second time period. Also included is paying the monetary payment amount to the casino for the space on the gaming floor of the casino for the second time period.

In yet another aspect, the invention is directed to a method of leasing a space on a gaming floor of a casino for placement of a new slot machine that includes determining a monetary average machine net win in monetary units per casino gaming machine per unit of time for a group of existing casino gaming machines located on the gaming floor of the casino that includes the space on the gaming floor. The monetary average machine net win being calculated by dividing a total net win amount for a first time period at all of the existing casino gaming machines in the group by the total number of the existing casino gaming machines in the group of casino gaming machines. The total net win amount equaling a total coin-in amount for all of the existing casino gaming machines in the group minus a total paid out amount for all of the existing casino gaming machines in the group and minus any amounts escrowed for a future jackpot or award.

The method also includes initiating shipment of the new slot machine to the casino for placement on the space of the gaming floor of the casino, the new slot machine including a housing, a game display unit having a first mechanically rotatable slot reel, a second mechanically rotatable slot reel, and a third mechanically rotatable slot reel, wherein the slot reels are disposed in the housing so that the mechanically rotatable slot reels are at least partially visible to a player of the new slot machine, a value input device. The new slot machine also has a controller that is programmed to allow a player to make a wager, and to determine a value payout associated with an outcome of a game utilizing the mechanically rotatable slot reels.

Also included in the method is receiving at least a portion of electronic funds wagered at the new slot machine over the second time period and determining a monetary payment amount for the space on the gaming floor of the casino for the second time period. The monetary payment amount equaling a percentage of a total coin-in amount wagered at the new slot machine over the second time period. Also included is paying the monetary payment amount to the casino for the space on the gaming floor of the casino for the second time period.

In yet another aspect, the invention is directed to a method of leasing a plurality of spaces on a gaming floor of a casino for placement of a plurality of new casino gaming machines that includes determining an aggregate machine net win amount in monetary units per unit of time for a group of existing casino gaming machines located on the gaming floor of the casino that includes the space on the gaming floor, the aggregate machine net win amount equaling a total net win amount for a first time period at all of the existing casino gaming machines in the group of casino gaming machines. The total net win amount equaling a total coin-in amount for all of the existing casino gaming machines in the group minus a total paid out amount for all of the existing casino gaming machines in the group and minus any amounts escrowed for a future jackpot or award.

The method also includes negotiating a lease percentage to be taken of a total coin-in amount at the new machines over a second time period, the new machines being placed at the spaces on the gaming floor of the casino for the second time period The negotiated percentage being based on the aggregate machine net win amount. The new casino gaming machines include a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

Also included in the method is receiving at least a portion of electronic funds wagered at the new casino gaming machines over a second time period, determining a monetary payment amount for the spaces on the gaming floor of the casino for the second time period, the monetary payment amount equaling the percentage of the total coin-in amount at the new gaming machines over the second time period. Also included is paying the monetary payment amount to the casino for the spaces on the gaming floor of the casino for the second time period.

Additional aspects of the invention are defined by the claims of this patent.

BRIEF DESCRIPTION OF THE DRAWINGS

FIG. 1 is a flowchart of several steps followed in a first prior art method of leasing a gaming machine;

FIG. 2 is a flowchart of several steps followed in a second prior art method of leasing a gaming machine;

FIG. 3 is a flowchart of several steps followed in a third prior art method of leasing a gaming machine;

FIG. 4 is a block diagram of an embodiment of a gaming system in accordance with the invention;

FIG. 14 is a flowchart of an embodiment of a main routine that may be performed during operation of one or more of the gaming machines;

DETAILED DESCRIPTION OF VARIOUS EMBODIMENTS

Figure 5:
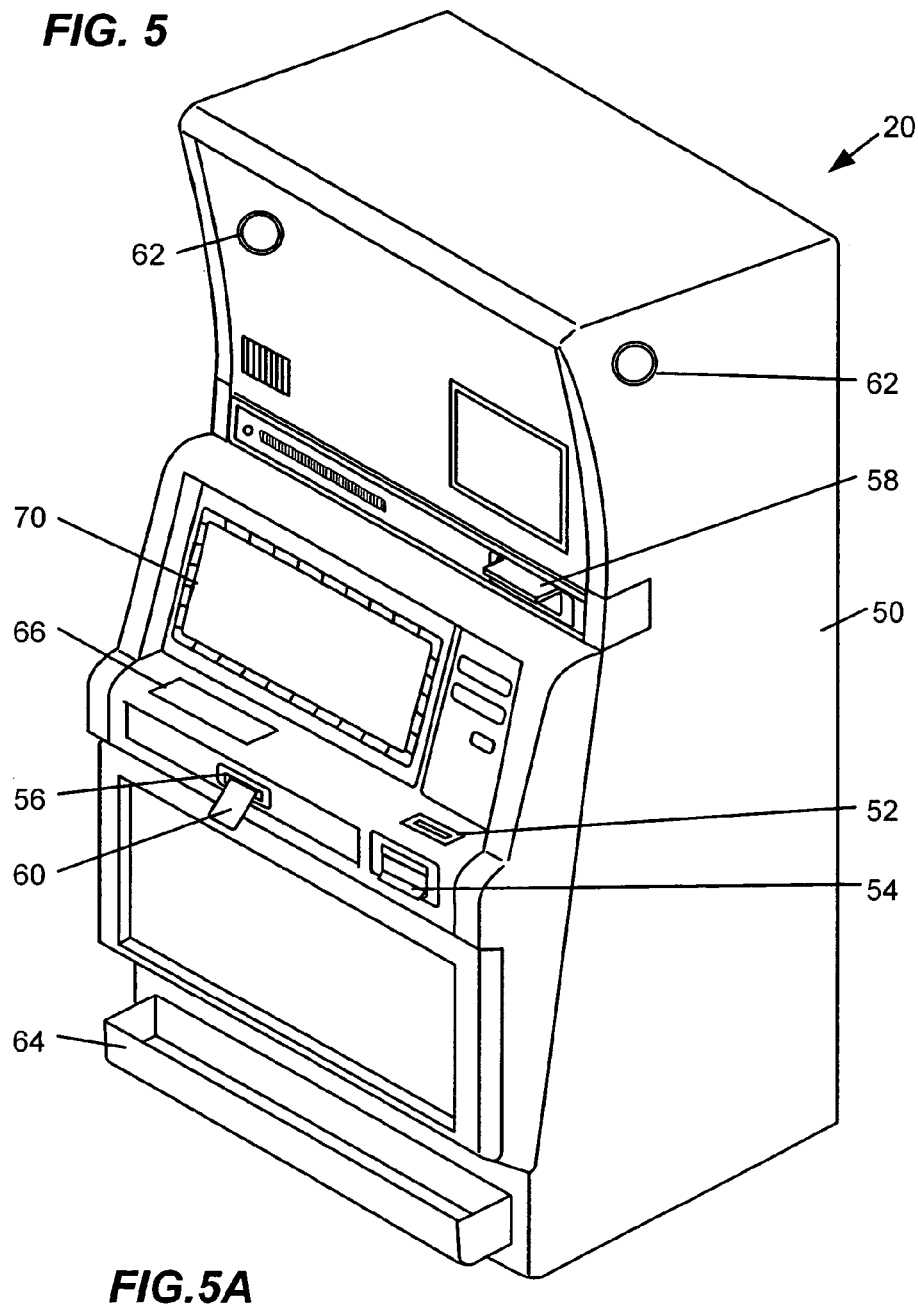
FIG. 5 is a perspective view of an embodiment of one of the gaming machines shown schematically in FIG. 4.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

FIG. 4 illustrates one possible embodiment of a casino gaming system 10 in accordance with the invention. Referring to FIG. 4, the casino gaming system 10 may include a first group or network 12 of casino gaming machines 20 operatively coupled to a network computer 22 via a network data link or bus 24. The casino gaming system 10 may include a second group or network 26 of casino gaming machines 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44. It should also be noted that a variety of other end-user devices, such as, for example, PDAs, laptops, cellular telephones, kiosks, or internet portals may be coupled to the first and second gaming networks 12, 26 to allow gaming access to users not using conventional gaming machines.

The first network 12 of gaming machines 20 may be provided in a first casino, and the second network 26 of gaming machines 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming machines 20. For example, the network computer 22 may continuously receive data from each of the gaming machines 20 indicative of the dollar amount and number of wagers being made on each of the gaming machines 20, data indicative of how much each of the gaming machines 20 is paying out in winnings, data regarding the identity and gaming habits of players playing each of the gaming machines 20, etc. The network computer 32 may be a server computer and may be used to perform the same or different functions in relation to the gaming machines 30 as the network computer 22 described above.

Although each network 12, 26 is shown to include one network computer 22, 32 and four gaming machines 20, 30, it should be understood that different numbers of computers and gaming machines may be utilized. For example, the network 12 may include a plurality of network computers 22 and tens or hundreds of gaming machines 20, all of which may be interconnected via the data link 24. The data link 24 may be provided as a dedicated hardwired link or a wireless link. Although the data link 24 is shown as a single data link 24, the data link 24 may comprise multiple data links.

FIG. 5 is a perspective view of one possible embodiment of one or more of the gaming machines 20. Although the following description addresses the design of the gaming machines 20, it should be understood that the gaming machines 30 may have the same design as the gaming machines 20 described below. It should be understood that the design of one or more of the gaming machines 20 may be different than the design of other gaming machines 20, and that the design of one or more of the gaming machines 30 may be different than the design of other gaming machines 30. Each gaming machine 20 may be any type of casino gaming machine and may have various different structures and methods of operation. For exemplary purposes, various designs of the gaming machines 20 are described below, but it should be understood that numerous other designs may be utilized.

Referring to FIG. 5, the casino gaming machine 20 may include a housing or cabinet 50 and one or more input devices, which may include a coin slot or acceptor 52, a paper currency acceptor 54, a ticket reader/printer 56 and a card reader 58, which may be used to input value to the gaming machine 20.

A value input device may include any device that can accept value from a customer. As used herein, the term "value" may encompass gaming tokens, coins, paper currency, ticket vouchers, credit or debit cards, smart cards, and any other object representative of value.

If provided on the gaming machine 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming machines 20 may have ticket printers 56 that may be used to print ticket vouchers 60, which could then be used by a player in other gaming machines 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming machine 20 may include one or more audio speakers 62, a coin payout tray 64, an input control panel 66, and a display unit 70. Where the gaming machine 20 is designed to facilitate play of a video casino game, such as video poker or video slots, the display unit 70 may be a color video display unit that displays images relating to the particular game or games. Where the gaming machine 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 5A:
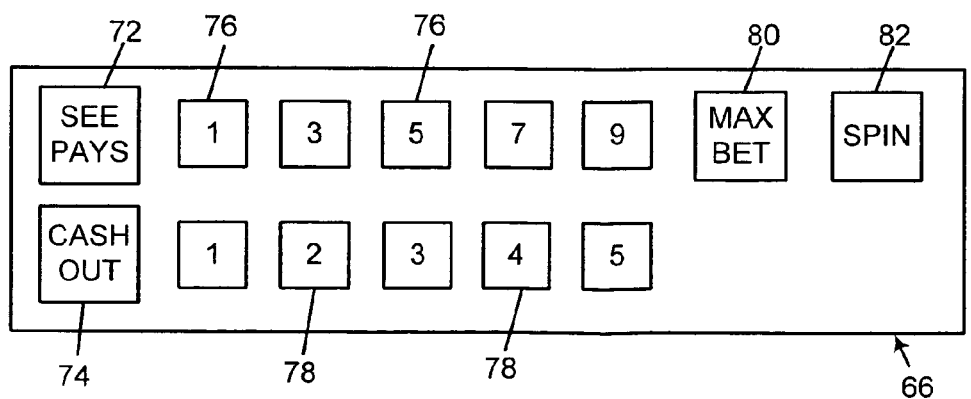
FIG. 5A illustrates an embodiment of a control panel for a gaming machine.

FIG. 5A illustrates one possible embodiment of the control panel 66, which may be used where the gaming machine 20 is a slot machine having a plurality of mechanical or "virtual" reels. Referring to FIG. 5A, if the display unit 70 is provided in the form of a video display unit, the control panel 66 may include a "See Pays" button 72 that, when activated, causes the display unit 70 to generate one or more display screens showing the odds or payout information for the game or games provided by the gaming machine 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming machine 20, in which case the gaming machine 20 may return value to the player, such as by returning a number of coins to the player via the payout tray 64.

If the gaming machine 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming machine 20 provides a slots game having a plurality of reels, the control panel 66 may be provided with a plurality of selection buttons 78 each of which allows a player to specify a wager amount for each payline selected. For example, if the smallest wager accepted by the gaming machine 20 is a quarter ($0.25), the gaming machine 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 5A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming machine 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming machine 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Figure 6:
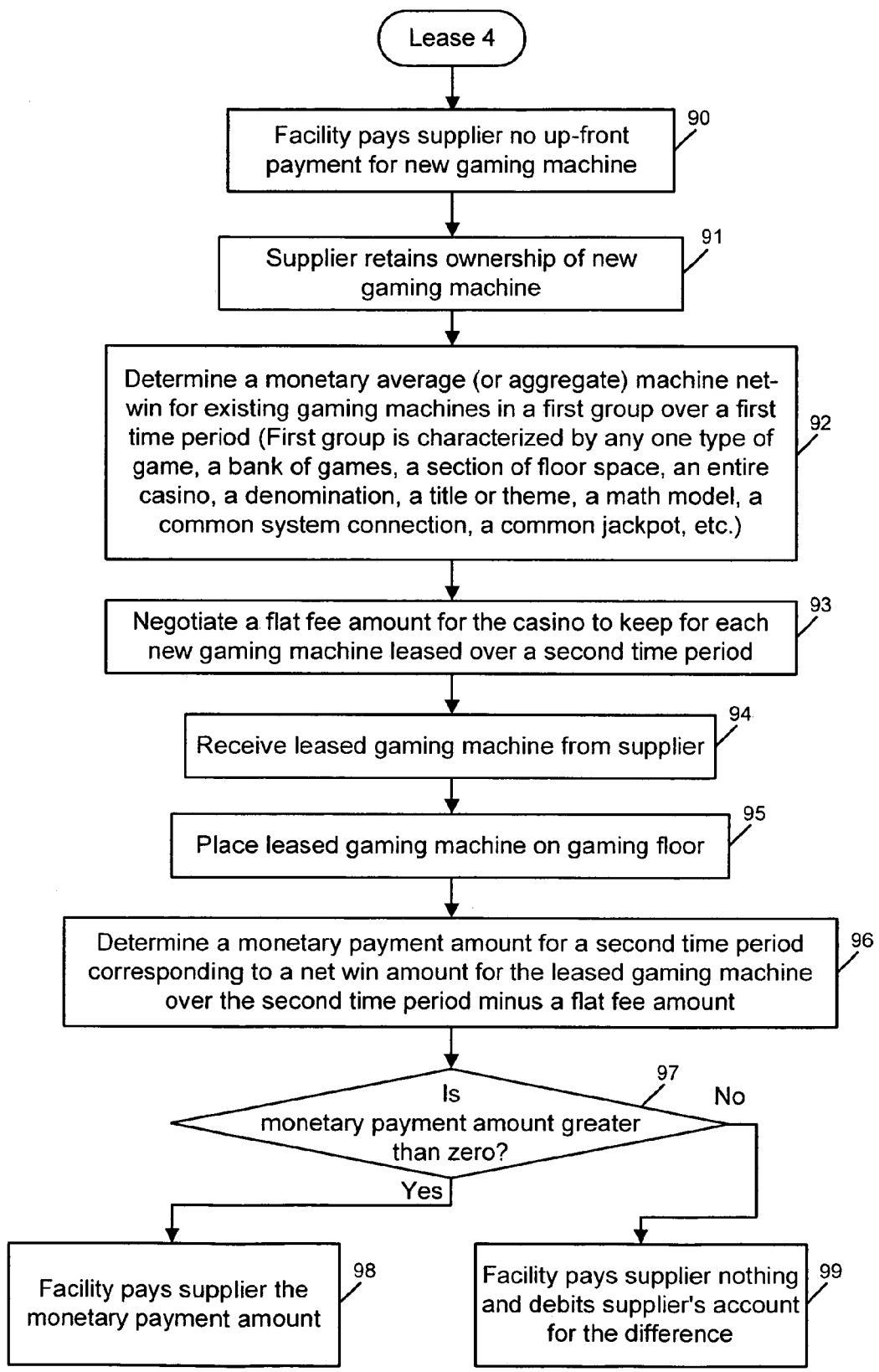
FIG. 6 is a flowchart of several steps followed in an exemplary method of leasing a gaming machine.

FIG. 6 illustrates several steps that may be followed in an exemplary method of leasing a gaming machine. This exemplary method shown in FIG. 6 may be referred to as a reverse lease, as the supplier is essentially paying for a place or space on the facility floor, and may begin with the concept that the facility, such as, for example, a gaming casino, pays a gaming machine supplier no up-front payment for one or more new gaming machines (block 90), and the supplier retains ownership of the new gaming machine (block 91).

Next, a monetary average machine net win in monetary units per casino gaming machine per unit of time may be determined for a group of existing casino gaming machines located on a gaming floor of the casino (block 92). The monetary average machine net win may be calculated by dividing a total net win amount for a first time period at all of the existing casino gaming machines in the group by the total number of the existing casino gaming machines in the group of casino gaming machines. The total net win amount may equal a total coin-in amount for all of the existing casino gaming machines in the group minus a total paid out amount for all of the existing casino gaming machines in the group and minus any amounts escrowed for a future jackpot or award. Also, the average machine net win may, for example, be calculated in dollars per day per machine.

A wide variety of variations could be used to define the group of casino gaming machines. The group could be defined based on a specific characteristic of the gaming machines in the group, such as, for example, a particular type of game that is played on the machines, a physical location of the gaming machines, or other common characteristics. Characteristics associated with the gaming machines' physical location could include at least one specific bank of gaming machines, at least one particular section of floor space, an entire casino, etc. Other examples of common characteristics could include a denomination (i.e., nickel, dime, quarter, dollar), a title or theme, a particular math model (i.e., payout table), a common system connection, a common jackpot, etc.

As an alternative to determining a monetary average machine net win per casino gaming machine for a group of existing casino gaming machines located on a gaming floor of the casino, an aggregate machine net win amount for the group of existing casino gaming machines located on the gaming floor of the casino may be determined.

The lease method of FIG. 6 may also include negotiating a flat fee amount for the casino to keep for each new gaming machine that is leased by the supplier over a second time period, such as a month (block 93). The supplier may then receive the leased casino gaming machine from the casino gaming machine supplier (block 94), and place the leased gaming machine on the gaming floor of the casino (block 95). The leased casino gaming machine may have a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

The lease method shown in FIG. 6 may also include determining a monetary payment amount for the leased casino gaming machine for a second time period based on the average machine net win (block 96). The monetary payment amount may correspond to a leased machine net win amount for the leased casino gaming machine minus a flat fee lease amount that is less than, equal to, or greater than the product of the average machine net win and the second time period. The leased machine net win amount may equal a total coin-in amount at the leased casino gaming machine over the second time period minus a total amount paid out to all players playing at the leased casino gaming machine over the second time period and minus any amounts escrowed for a future jackpot or award over the second time period.

The method may then determine if the monetary payment amount is greater than zero (block 97). If it is determined at the block 97 that the monetary payment amount is greater than zero, the facility may pay the gaming machine supplier the monetary payment amount (block 98). If it is determined at the block 97 that the monetary payment amount is not greater than zero, the facility may pay the supplier nothing and debit the supplier's account for the difference (block 99).

While not shown in FIG. 6, the method may also include providing a player tracking service to the facility for an additional monetary sum. This additional sum may then be subtracted from the flat fee amount that is kept by the casino. Alternatively, the additional sum may be added to the flat fee amount that is kept by the casino. If the leased gaming machines are configured to operate in connection with a server or a network, then the supplier may modify the gaming content, payout percentages for the primary games as well as the bonus games, and other features and functionality on the fly. However, this is not to say that the facilities couldn't also control these changes or require notification and/or approval before allowing the changes. The supplier could include these changes for the same flat fee amount or charge an additional amount for various changes that are made.

It should also be noted that several of the leased gaming machines may be interconnected to form a network of leased gaming machines in a similar fashion to that illustrated in FIG. 4. If several leased gaming machines are interconnected, an overall monetary payment amount may be calculated which equals a sum of the monetary payment amounts for each leased casino gaming machine in the network of leased gaming machines. Also, the first time period may be concurrent with the second time period. Alternatively, the second time period may be a subsequent time period from the first time period. In other words, the monetary payment amount could be determined based on an average machine net win amount for a group of gaming machines during a time period which is concurrent with the time period in which the leased casino gaming machine is at the casino.

For exemplary purposes only, in a specific example of the lease method shown in FIG. 6, there may be 50 total machines in the group of existing machines, the total coin-in for all machines in the group may be $50,000 and the total paid out for all machines in the group may be $46,000. Thus, the average machine net win would be 80$/day/machine. The facility and the supplier may then negotiate a flat fee amount of $4,000 per month for each gaming machine leased. This would be a significant increase over the $2,400 in income that the facility was previously earning on average per month for the machines in the group of existing gaming machines. After a leased gaming machine has been on a casino floor for one month, the second time period, the total coin in amount at the leased machine may be $60,000 and the total paid out at the leased gaming machine for the month may be $55,200. Thus, the monetary lease payment amount to be paid by the casino to the supplier would equal $800.

Figure 7:
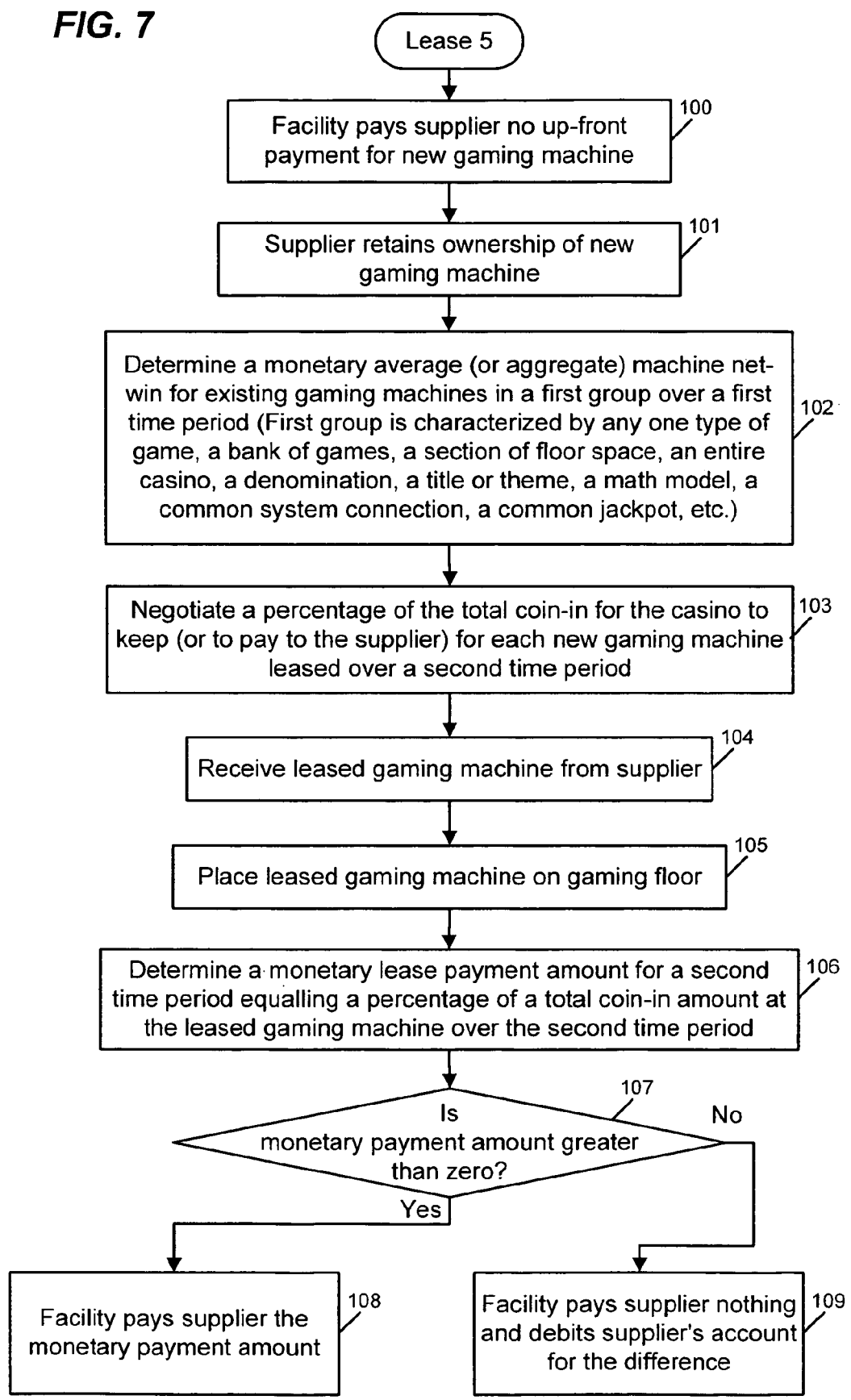
FIG. 7 is a flowchart of several steps followed in an alternative exemplary method of leasing a gaming machine.

FIG. 7 illustrates several steps that may be followed in another exemplary method of leasing a gaming machine. This exemplary method shown in FIG. 7 is an alternative reverse lease, and similar to the financial model discussed in FIG. 6, may begin with the concept that the facility, such as, for example, a gaming casino, pays a gaming machine supplier no up-front payment for one or more new gaming machines (block 100), and the supplier retains ownership of the new gaming machine (block 101).

A monetary average machine net win in monetary units per gaming machine per unit of time may be then be determined for a group of existing gaming machines located at a facility (block 102). As with the lease method shown in FIG. 6, the monetary average machine net win may be calculated by dividing a total net win amount for a first time period at all of the existing gaming machines in the group by the total number of the existing gaming machines in the group of gaming machines. The total net win amount may equal a total coin-in amount for all of the existing gaming machines in the group minus a total paid out amount for all of the existing gaming machines in the group and minus any amounts escrowed for a future jackpot or award. Also, the average machine net win may, for example, be calculated in dollars per day per machine.

A wide variety of variations could be used to define the group of casino gaming machines. The group could be defined based on a specific characteristic of the gaming machines in the group, such as, for example, a particular type of game that is played on the machines, a physical location of the gaming machines, or other common characteristics. Characteristics associated with the gaming machines' physical location could include at least one specific bank of gaming machines, at least one particular section of floor space, an entire casino, etc. Other examples of common characteristics could include a denomination (i.e., nickel, dime, quarter, dollar), a title or theme, a particular math model (i.e., payout table), a common system connection, a common jackpot, etc.

As an alternative to determining a monetary average machine net win per gaming machine for a group of existing gaming machines located at a facility, an aggregate machine net win amount for the group of existing gaming machines located at the facility may be determined.

The lease method of FIG. 7 may also include negotiating a percentage of a total coin-in for the facility to keep, or to pay to the supplier, for each new gaming machine that is leased by the supplier over a second time period, such as a month (block 103). There is no financial difference between the facility keeping 95% of $1000 or paying the supplier 5% of $1000. The casino may then receive the leased casino gaming machine from the casino gaming machine supplier (block 104), and place the leased gaming machine on the gaming floor of the casino (block 105). The leased casino gaming machine may have a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

The lease method shown in FIG. 7 may also include determining a monetary payment amount for the leased casino gaming machine for a second time period based on the average machine net win (block 106). The monetary payment amount may equal the percentage of the total coin-in amount for the leased casino gaming machine over the second time period. The lease may also include a condition to ensure that the monetary lease amount is equal to or greater than the average machine net win.

The method may then determine if the monetary payment amount is greater than zero (block 107). If it is determined at the block 107 that the monetary payment amount is greater than zero, the facility may pay the gaming machine supplier the monetary payment amount (block 108). If it is determined at the block 107 that the monetary payment amount is not greater than zero, the facility may pay the supplier nothing and debit the supplier's account for the difference (block 109).

While not shown in FIG. 7, the method may also include providing a player tracking service to the facility for an additional monetary sum. This additional sum may then be subtracted from the amount that is kept by the casino. Alternatively, the additional sum may be added to the amount that is kept by the casino. If the leased gaming machines are configured to operate in connection with a server or a network, then the supplier may modify the gaming content, payout percentages for the primary games as well as the bonus games, and other game elements on the fly. However, this is not to say that the facilities couldn't also control these changes or require notification and/or approval before allowing the changes. The supplier could include these changes for the same negotiated percentage or charge an additional amount for various changes that are made.

It should also be noted that several of the leased gaming machines may be interconnected to form a network of leased gaming machines in a similar fashion to that illustrated in FIG. 4. If several leased gaming machines are interconnected, an overall monetary payment amount may be calculated which equals a sum of the monetary payment amounts for each leased casino gaming machine in the network of leased gaming machines.

The negotiated percentage discussed with reference to block 103 may be a variable percentage. Thus, for example, the percentage may be decreased when the leased machine net win amount is less than the average machine net win. Another alternative could include subtracting an additional monetary amount from the total coin-in amount at the leased gaming machine over the second time period in determining the monetary payment amount.

Figure 8:
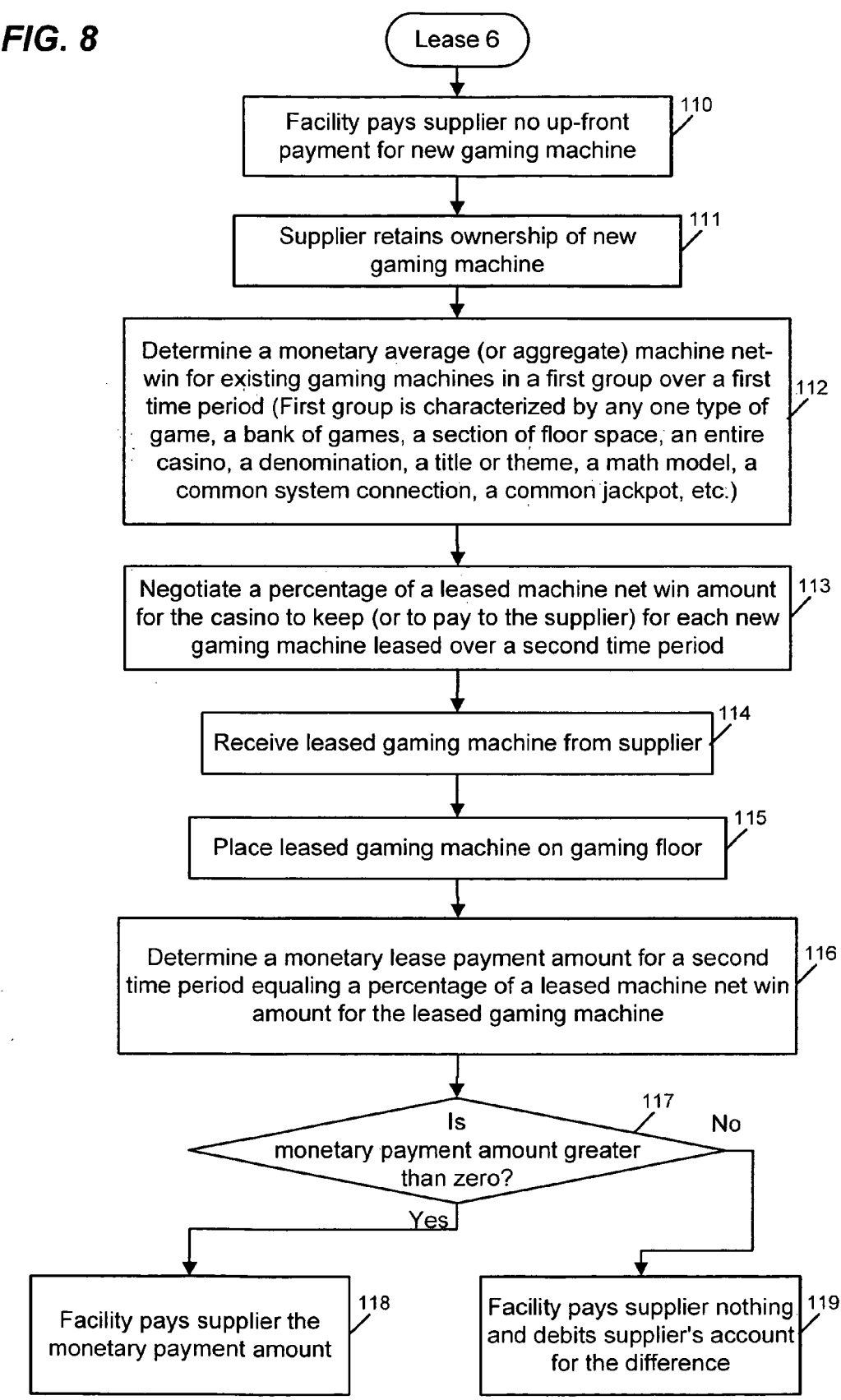
FIG. 8 is a flowchart of several steps followed in an alternative exemplary method of leasing a gaming machine.

FIG. 8 illustrates several steps that may be followed in another exemplary method of leasing a gaming machine. This exemplary method shown in FIG. 8 is an alternative reverse lease, and similar to the financial model discussed in FIGS. 6 and 7, and may begin with the concept that the facility, such as, for example, a gaming casino, pays a gaming machine supplier no up-front payment for one or more new gaming machines (block 110), and the supplier retains ownership of the new gaming machine (block 111).

A monetary average machine net win in monetary units per gaming machine per unit of time may then be determined for a group of existing gaming machines located at a facility (block 112). As with the lease methods shown in FIGS. 6 and 7, the monetary average machine net win may be calculated by dividing a total net win amount for a first time period at all of the existing gaming machines in the group by the total number of the existing gaming machines in the group of gaming machines. The total net win amount may equal a total coin-in amount for all of the existing gaming machines in the group minus a total paid out amount for all of the existing gaming machines in the group and minus any amounts escrowed for a future jackpot or award. Also, the average machine net win may, for example, be calculated in dollars per day per machine.

A wide variety of variations could be used to define the group of casino gaming machines. The group could be defined based on a specific characteristic of the gaming machines in the group, such as, for example, a particular type of game that is played on the machines, a physical location of the gaming machines, or other common characteristics. Characteristics associated with the gaming machines' physical location could include at least one specific bank of gaming machines, at least one particular section of floor space, an entire casino, etc. Other examples of common characteristics could include a denomination (i.e., nickel, dime, quarter, dollar), a title or theme, a particular math model (i.e., payout table), a common system connection, a common jackpot, etc.

As an alternative to determining a monetary average machine net win per casino gaming machine for a group of existing casino gaming machines located on a gaming floor of the casino, an aggregate machine net win amount for the group of existing casino gaming machines located on the gaming floor of the casino may be determined.

The lease method of FIG. 8 may also include negotiating a percentage of a leased machine net win amount for the facility to keep, or to pay to the supplier, for each new gaming machine that is leased by the supplier over a second time period, such as one month (block 113). There is no financial difference between the facility keeping 90% of $100 or paying the supplier 10% of $100. The supplier may then receive the leased gaming machine from the gaming machine supplier (block 114), and place the leased gaming machine on the floor of the facility (block 115). The leased gaming machine may have a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

The lease method shown in FIG. 8 may also include determining a monetary payment amount for the leased gaming machine for a second time period based on the average machine net win (block 116). The monetary payment amount may equal the percentage of the leased machine net win amount for the leased gaming machine over the second time period. The leased machine net win amount may equal a total coin-in amount at the leased gaming machine over the second time period minus a total amount paid out to all players playing at the leased gaming machine over the second time period. The monetary payment amount may alternatively be calculated by subtracting a percentage of the leased machine net win amount for the leased gaming machine from the leased machine net win amount over the second time period. The lease may also include a condition to ensure that the monetary lease amount is equal to or greater than the average machine net win.

The method may then determine if the monetary payment amount is greater than zero (block 117). If it is determined at the block 117 that the monetary payment amount is greater than zero, the facility may pay the gaming machine supplier the monetary payment amount (block 118). If it is determined at the block 117 that the monetary payment amount is not greater than zero, the facility may pay the supplier nothing and debit the supplier's account for the difference (block 119).

While not shown in FIG. 8, the method may also include providing a player tracking service to the facility for an additional monetary sum. This additional sum may then be subtracted from the amount that is kept by the facility. Alternatively, the additional sum may be added to the amount that is kept by the facility. If the leased gaming machines are configured to operate in connection with a server or a network, then the supplier may modify the gaming content, payout percentages for the primary games as well as the bonus games, and other game elements on the fly. However, this is not to say that the facility couldn't also control these changes or require notification and/or approval before allowing the changes. The supplier could include these changes for the same negotiated percentage or charge an additional amount for various changes that are made.

It should also be noted that several of the leased gaming machines may be interconnected to form a network of leased gaming machines in a similar fashion to that illustrated in FIG. 4. If several leased gaming machines are interconnected, an overall monetary payment amount may be calculated which equals a sum of the monetary payment amounts for each leased gaming machine in the network of leased gaming machines.

The negotiated percentage discussed with reference to block 113 may be a variable percentage. Thus, for example, the percentage may be decreased when the leased machine net win amount is less than the average machine net win. Another alternative could include subtracting an additional monetary amount from the total coin-in amount at the leased gaming machine over the second time period before calculating the leased machine net win amount in determining the monetary payment amount. Also, the first time period may be concurrent with the second time period. Alternatively, the second time period may be a subsequent time period from the first time period. In other words, the monetary payment amount could be determined based on an average machine net win amount for a group of gaming machines during a time period which is concurrent with the time period in which the leased gaming machine is at the facility.

Figure 9:
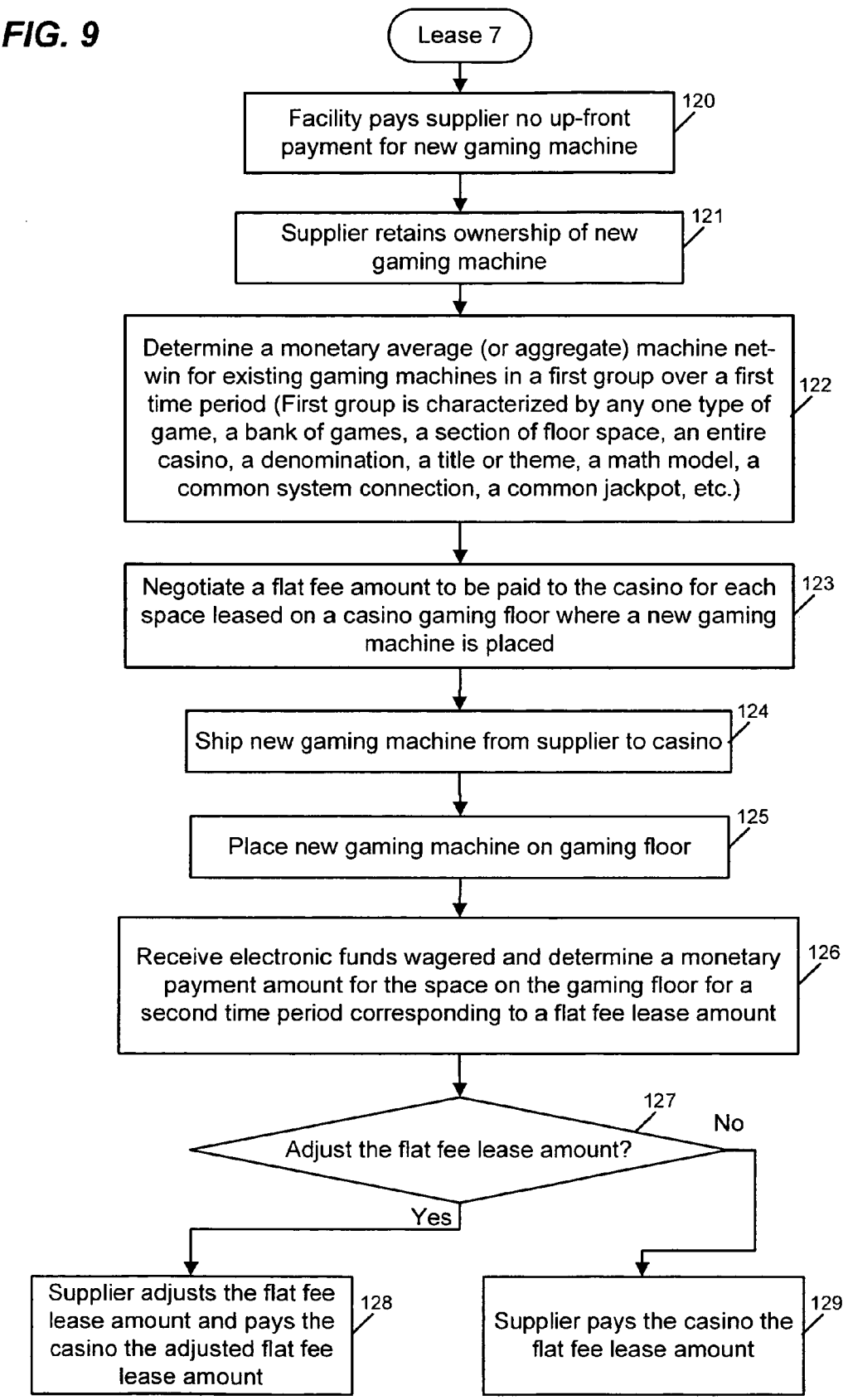
FIG. 9 is a flowchart of several steps followed in an alternative exemplary method of leasing a gaming machine.

FIG. 9 illustrates several steps that may be followed in an exemplary method of leasing a space on a gaming floor of a casino for placement of a new casino gaming machine. This exemplary method shown in FIG. 9 may be referred to as a reverse lease, as the supplier is essentially paying for a space on the facility floor, which reverses the traditional flow of monies in traditional lease models. This is particularly applicable where substantial wagers are made using electronic funds (i.e., any funds other than currencies including bills and coins). The method may begin with the concept that the facility, such as, for example, a gaming casino, pays a gaming machine supplier no up-front payment for one or more new gaming machines (block 120), and the supplier retains ownership of the new gaming machine (block 121).

Next, a monetary average machine net win in monetary units per casino gaming machine per unit of time may be determined for a group of existing casino gaming machines located on a gaming floor of the casino (block 122). The monetary average machine net win may be calculated by dividing a total net win amount for a first time period at all of the existing casino gaming machines in the group by the total number of the existing casino gaming machines in the group of casino gaming machines. The total net win amount may equal a total coin-in amount for all of the existing casino gaming machines in the group minus a total paid out amount for all of the existing casino gaming machines in the group and minus any amounts escrowed for a future jackpot or award. Also, the average machine net win may, for example, be calculated in dollars per day per machine.

As with the previous examples, a wide variety of variations could be used to define the group of casino gaming machines. The group could be defined based on a specific characteristic of the gaming machines in the group, such as, for example, a particular type of game that is played on the machines, a physical location of the gaming machines, or other common characteristics. Characteristics associated with the gaming machines' physical location could include a specific bank of gaming machines, a particular section of floor space, an entire casino, etc. Other examples of common characteristics could include a denomination (i.e., nickel, dime, quarter, dollar), a title or theme, a particular math model (i.e., payout table), a common system connection, a common jackpot, etc.

As an alternative to determining a monetary average machine net win per casino gaming machine for a group of existing casino gaming machines located on a gaming floor of the casino, an aggregate machine net win amount for the group of existing casino gaming machines located on the gaming floor of the casino may be determined.

The lease method of FIG. 9 may also include negotiating a flat fee amount to be paid to the casino for each space leased on the casino gaming floor where a new gaming machine is placed (block 123). The supplier may then initiate or facilitate shipment of the new casino gaming machine to the casino (block 124) for placement on the space of the gaming floor of the casino (block 125). The new casino gaming machine may have a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

The lease method shown in FIG. 9 may also include receiving at least a portion of electronic funds wagered at the new casino gaming machine over a second time period and determining a monetary payment amount for the space on the gaming floor for the second time period (block 126). The monetary payment amount may correspond to the flat fee lease amount based on the average machine net win. The flat fee lease amount may be less than the product of the average machine net win and the second time period. This may be attractive to a casino because this financial model allows the casino to avoid making any capital expenditures. The flat fee lease amount may also be equal to the product of the average machine net win and the second time period. The flat fee lease amount could also be greater than the product of the average machine net win and the second time period. The new machine net win amount may equal a total coin-in amount at the new casino gaming machine over the second time period minus a total amount paid out to all players playing at the new casino gaming machine over the second time period and minus any amounts escrowed for a future jackpot or award over the second time period.

The method may then determine if the flat fee lease amount or the monetary payment amount should be adjusted (block 127). If it is determined at the block 127 that the flat fee lease amount or the monetary payment amount should be adjusted, the supplier may pay the casino the adjusted amount (block 128). If it is determined at the block 127 that no adjustment is required, the supplier may pay the casino the flat fee lease amount (block 129).

It should be noted that the flat fee lease amount could have certain factors that adjust it, such as, for example, increasing or decreasing the flat fee lease amount according to the consumer price index. The flat fee lease amount could also be adjusted by a percentage that is correlated to a change in casino profitability. Furthermore, additional amounts could be added to the flat fee lease amount, such as, for example, a percentage of a net win at the new gaming machine or a percentage of a total coin-in at the new gaming machine.

While not shown in FIG. 9, the method may also include providing a player tracking service to the casino for an additional monetary sum. This additional sum may then be subtracted from the flat fee amount that is paid to the casino. If the new gaming machines are configured to operate in connection with a server or a network, then the supplier may modify the gaming content, payout percentages for the primary games as well as the bonus games, and other game elements on the fly. However, this is not to say that the facilities couldn't also control these changes or require notification and/or approval before allowing the changes. The supplier could include these changes for the same flat fee amount or charge an additional amount for various changes that are made.

It should also be noted that several of the new gaming machines may be interconnected to form a network of new gaming machines in a similar fashion to that illustrated in FIG. 4. If several new gaming machines are interconnected, an overall monetary payment amount may be calculated which equals a sum of the monetary payment amounts for each new casino gaming machine in the network of new gaming machines. Also, the first time period may be concurrent with the second time period. Alternatively, the second time period may be a subsequent time period from the first time period. In other words, the monetary payment amount could be determined based on an average machine net win amount for a group of gaming machines during a time period which is concurrent with the time period in which the leased casino gaming machine is at the casino.

For exemplary purposes only, in a specific example of the lease method shown in FIG. 9, there may be 50 total machines in the group of existing machines, the total coin-in for all machines in the group may be $50,000/day and the total paid out for all machines in the group may be $46,000/day. Thus, the average machine net win would be 80$/day/machine. The facility and the supplier may then negotiate a flat fee amount of $4,000 per month for each space on a gaming floor of a casino having a new gaming machine placed thereon. This would be a significant increase over the $2,400 in income that the facility was previously earning on average per month for the machines in the group of existing gaming machines. Additionally, the casino would not have to make any monthly payments for the new gaming machine. After a new gaming machine has been on the space of the casino gaming floor for one month, the second time period, the total coin in amount at the new machine may be $60,000 and the total paid out at the new gaming machine for the month may be $55,200. Thus, the monetary lease payment amount would equal $4,000.

Figure 10:
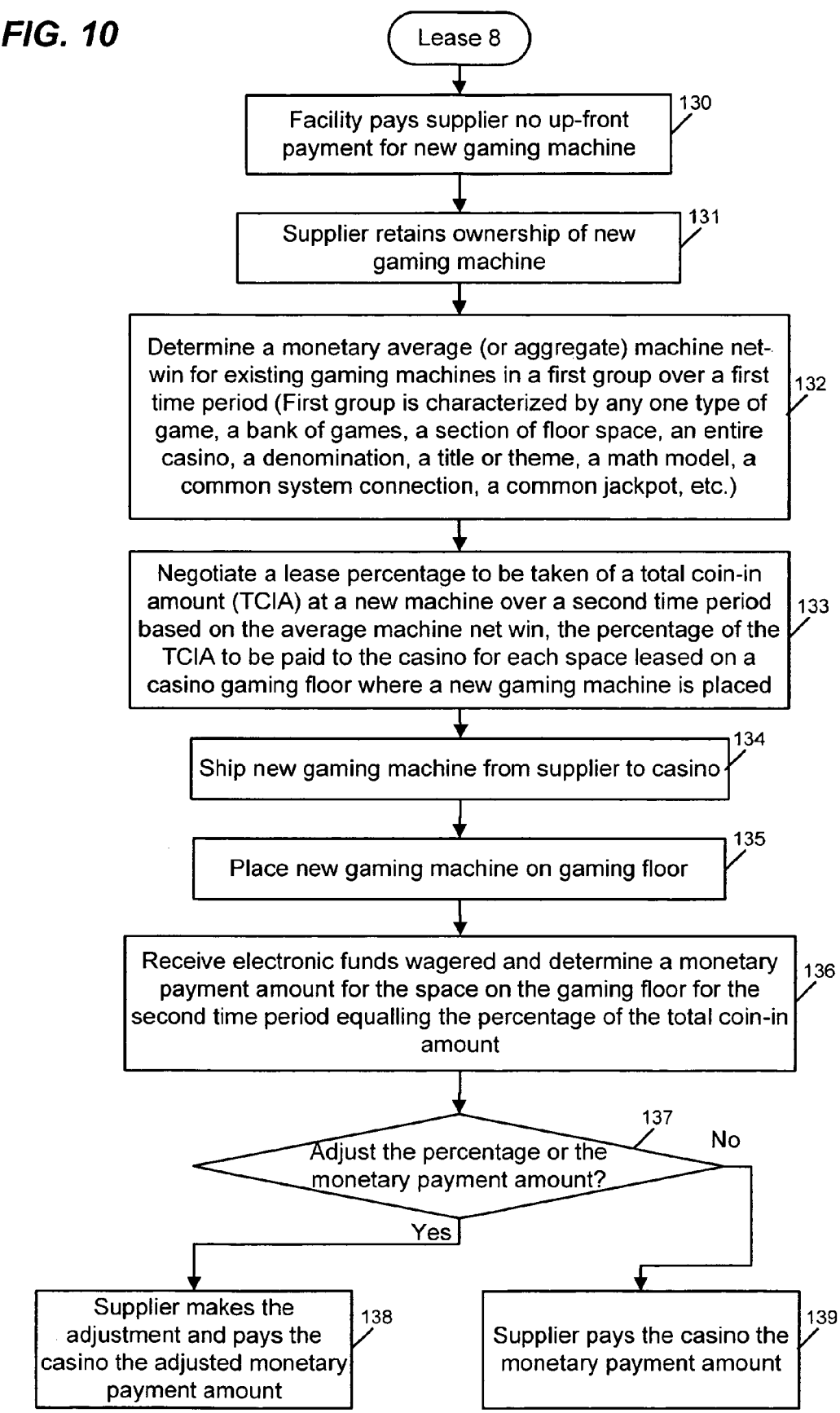
FIG. 10 is a flowchart of several steps followed in an alternative exemplary method of leasing a gaming machine.

FIG. 10 illustrates several steps that may be followed in another exemplary method of leasing a space on a gaming floor of a casino for placement of a new casino gaming machine. This exemplary method shown in FIG. 10 is an alternative reverse lease, and similar to the financial model discussed in FIG. 9, may begin with the concept that the facility, such as, for example, a gaming casino, pays a gaming machine supplier no up-front payment for one or more new gaming machines (block 130), and the supplier retains ownership of the new gaming machine (block 131).

A monetary average machine net win in monetary units per gaming machine per unit of time may be then be determined for a group of existing gaming machines located at a facility (block 132). As with the lease method shown in FIG. 9, the monetary average machine net win may be calculated by dividing a total net win amount for a first time period at all of the existing gaming machines in the group by the total number of the existing gaming machines in the group of gaming machines. The total net win amount may equal a total coin-in amount for all of the existing gaming machines in the group minus a total paid out amount for all of the existing gaming machines in the group and minus any amounts escrowed for a future jackpot or award. Also, the average machine net win may, for example, be calculated in dollars per day per machine.

A wide variety of variations could be used to define the group of casino gaming machines. The group could be defined based on a specific characteristic of the gaming machines in the group, such as, for example, a particular type of game that is played on the machines, a physical location of the gaming machines, or other common characteristics. Characteristics associated with the gaming machines' physical location could include at least one specific bank of gaming machines, at least one particular section of floor space, an entire casino, etc. Other examples of common characteristics could include a denomination (i.e., nickel, dime, quarter, dollar), a title or theme, a particular math model (i.e., payout table), a common system connection, a common jackpot, etc.

As an alternative to determining a monetary average machine net win per casino gaming machine for a group of existing casino gaming machines located on a gaming floor of the casino, an aggregate machine net win amount for the group of existing casino gaming machines located on the gaming floor of the casino may be determined.

The lease method of FIG. 10 may also include negotiating a lease percentage to be taken of a total coin-in amount over a second time period based on the average machine net win (block 133). The lease percentage could also be adjusted based on gaming statistics associated with other gaming units in the casino. The percentage of a total coin-in amount may be paid to the casino for each space leased on a casino gaming floor where a new gaming machine is placed. The casino may then initiate shipping of the new casino gaming machine to the casino (block 134), and place the new gaming machine on the gaming floor of the casino (block 135). The new casino gaming machine may have a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

The lease method shown in FIG. 10 may also include receiving at least a portion of electronic funds wagered at the new casino gaming machine over a second time period and determining a monetary payment amount for the new casino gaming machine for the second time period (block 136). The monetary payment amount may equal the percentage of the total coin-in amount at the new casino gaming machine over the second time period. The lease may also include a condition to ensure that the monetary lease amount is equal to or greater than the average machine net win.

The method may then determine if the lease percentage or the monetary payment amount should be adjusted (block 137). If it is determined at the block 137 that the lease percentage or the monetary payment amount should be adjusted, the supplier may pay the casino the adjusted amount (block 138). If it is determined at the block 137 that the lease percentage or the monetary payment amount should not be adjusted, the supplier may pay the casino the monetary payment amount (block 139).

It should be noted that the lease percentage could be a variable percentage. The lease percentage could be increased when the new machine net win amount is determined to be less than the average machine new win. Additionally, the monetary payment could be adjusted for a similar reason.

While not shown in FIG. 10, the method may also include providing a player tracking service to the facility for an additional monetary sum. This additional sum may then be subtracted from the amount that is paid to the casino. If the new gaming machines are configured to operate in connection with a server or a network, then the supplier may modify the gaming content, payout percentages for the primary games as well as the bonus games, and other features and functionality on the fly. However, this is not to say that the facilities couldn't also control these changes or require notification and/or approval before allowing the changes. The supplier could include these changes for the same negotiated percentage or charge an additional amount for various changes that are made.

It should also be noted that several of the new gaming machines may be interconnected to form a network of new gaming machines in a similar fashion to that illustrated in FIG. 4. If several new gaming machines are interconnected, an overall monetary payment amount may be calculated which equals a sum of the monetary payment amounts for each new casino gaming machine in the network of new gaming machines.

As stated above, the negotiated percentage discussed with reference to block 133 may be a variable percentage. Thus, for example, the percentage may be increased when the leased machine net win amount is less than the average machine net win. Other alternatives could include adding or subtracting an additional monetary amount from the total coin-in amount at the new gaming machine over the second time period in determining the monetary payment amount and subtracting any amounts escrowed for a future jackpot or award over the second time period. Also, the first time period may be concurrent with the second time period. Alternatively, the second time period may be a subsequent time period from the first time period. In other words, the monetary payment amount could be determined based on an average machine net win amount for a group of gaming machines during a time period which is concurrent with the time period in which the leased casino gaming machine is at the casino.

Figure 11:
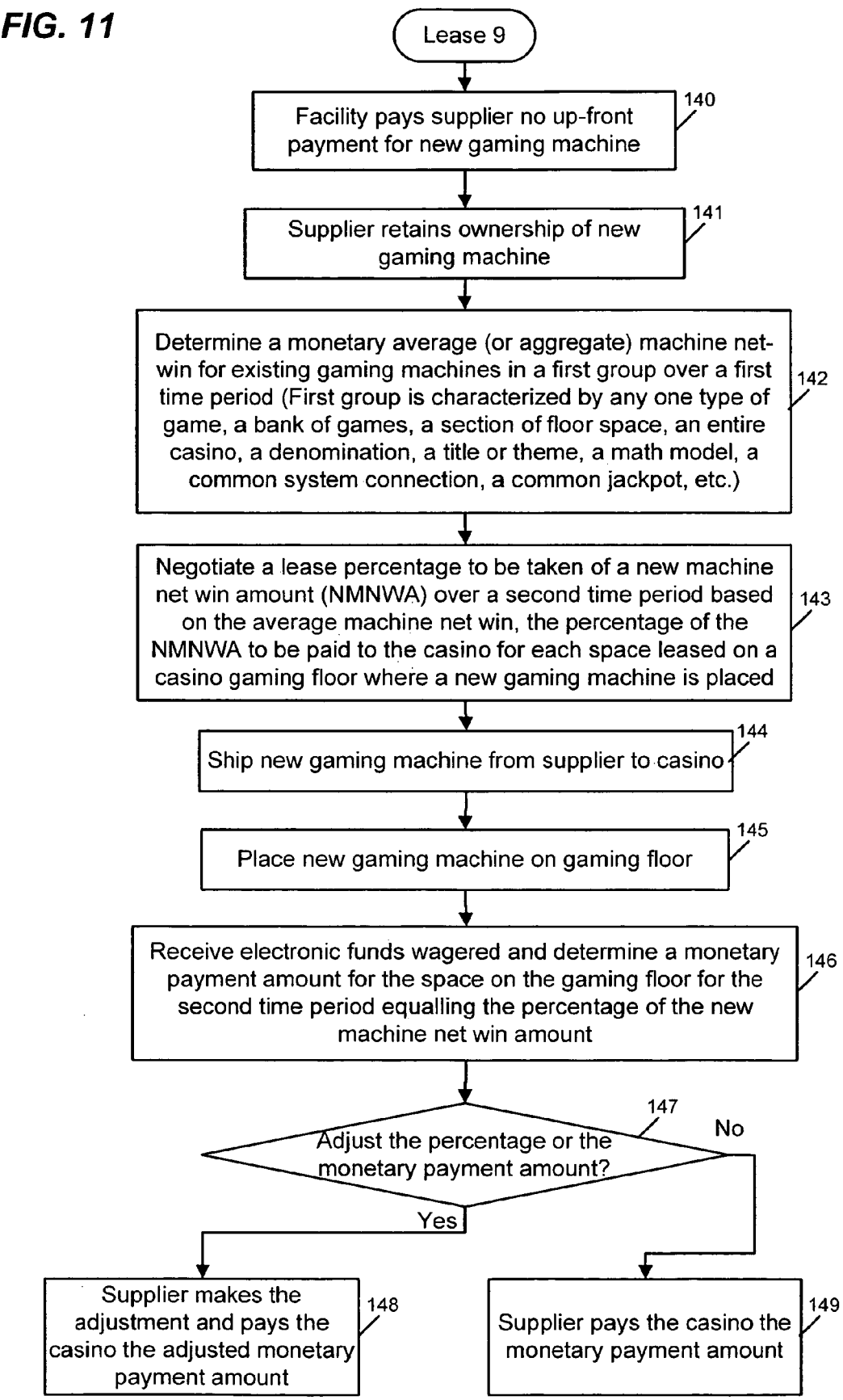
FIG. 11 is a flowchart of several steps followed in an alternative exemplary method of leasing a gaming machine.

FIG. 11 illustrates several steps that may be followed in another exemplary method of leasing a space on a gaming floor of a casino for placement of a new casino gaming machine. This exemplary method shown in FIG. 11 is an alternative reverse lease, and similar to the financial model discussed in FIGS. 9 and 10, and may begin with the concept that the facility, such as, for example, a gaming casino, pays a gaming machine supplier no up-front payment for one or more new gaming machines (block 140), and the supplier retains ownership of the new gaming machine (block 141).

A monetary average machine net win in monetary units per gaming machine per unit of time may then be determined for a group of existing gaming machines located at a facility (block 142). As with the lease methods shown in FIGS. 9 and 10, the monetary average machine net win may be calculated by dividing a total net win amount for a first time period at all of the existing gaming machines in the group by the total number of the existing gaming machines in the group of gaming machines. The total net win amount may equal a total coin-in amount for all of the existing gaming machines in the group minus a total paid out amount for all of the existing gaming machines in the group and minus any amounts escrowed for a future jackpot or award. Also, the average machine net win may, for example, be calculated in dollars per day per machine.

A wide variety of variations could be used to define the group of casino gaming machines. The group could be defined based on a specific characteristic of the gaming machines in the group, such as, for example, a particular type of game that is played on the machines, a physical location of the gaming machines, or other common characteristics. Characteristics associated with the gaming machines' physical location could include at least one specific bank of gaming machines, at least one particular section of floor space, an entire casino, etc. Other examples of common characteristics could include a denomination (i.e., nickel, dime, quarter, dollar), a title or theme, a particular math model (i.e., payout table), a common system connection, a common jackpot, etc.

As an alternative to determining a monetary average machine net win per casino gaming machine for a group of existing casino gaming machines located on a gaming floor of the casino, an aggregate machine net win amount for the group of existing casino gaming machines located on the gaming floor of the casino may be determined.

The lease method of FIG. 11 may also include negotiating a lease percentage to be taken of a new machine net win amount over a second time period based on the average machine net win (block 143). The percentage of a new machine net win amount may be paid to the casino for each space leased on a casino gaming floor where a new gaming machine is placed. The casino may then initiate shipping of the new casino gaming machine to the casino (block 144), and place the new gaming machine on the gaming floor of the casino (block 145). The new gaming machine may have a game display unit that is capable of generating video images, a value input device, and a controller that is programmed to allow a player to make a wager, to determine a value payout associated with an outcome of a game, and to cause a video image representing one of the following games to be generated on the game display unit: poker, blackjack, slots, keno or bingo.

The lease method shown in FIG. 11 may also include determining a monetary payment amount for each space leased on the casino gaming floor where a new gaming machine is placed for a second time period. The percentage based on the average machine net win (block 146). The monetary payment amount may equal the percentage of the new machine net win amount. The new machine net win amount may equal a total coin-in amount at the new gaming machine over the second time period minus a total amount paid out to all players playing at the new gaming machine over the second time period and minus any amounts escrowed for a future jackpot or award over the second time period. The lease may also include a condition to ensure that the monetary lease amount is equal to or greater than the average machine net win.

The method may then determine if the lease percentage or the monetary payment amount should be adjusted (block 147). If it is determined at the block 147 that the lease percentage or the monetary payment amount should be adjusted, the supplier may pay the casino the adjusted monetary payment amount (block 148). If it is determined at the block 147 that the monetary payment amount should not be adjusted, the supplier may pay the casino the monetary payment amount (block 149).

While not shown in FIG. 11, the method may also include providing a player tracking service to the facility for an additional monetary sum. This additional sum may then be subtracted from the amount that is paid to the facility. If the new gaming machines are configured to operate in connection with a server or a network, then the supplier may modify the gaming content, payout percentages for the primary games as well as the bonus games, and other features and functionality on the fly. However, this is not to say that the facility couldn't also control these changes or require notification and/or approval before allowing the changes. The supplier could include these changes for the same negotiated percentage or charge an additional amount for various changes that are made.

It should also be noted that several of the new gaming machines may be interconnected to form a network of new gaming machines in a similar fashion to that illustrated in FIG. 4. If several new gaming machines are interconnected, an overall monetary payment amount may be calculated which equals a sum of the monetary payment amounts for each new gaming machine in the network of new gaming machines.

The negotiated percentage discussed with reference to block 143 may be a variable percentage. Thus, for example, the percentage may be increased when the new machine net win amount is less than the average machine net win. Another alternative could include adding an additional monetary amount to the total coin-in amount at the new gaming machine over the second time period before determining the monetary payment amount. Also, the first time period may be concurrent with the second time period. Alternatively, the second time period may be a subsequent time period from the first time period. In other words, the monetary payment amount could be determined based on an average machine net win amount for a group of gaming machines during a time period which is concurrent with the time period in which the leased casino gaming machine is at the casino.

Gaming Machine Electronics

Figure 12:
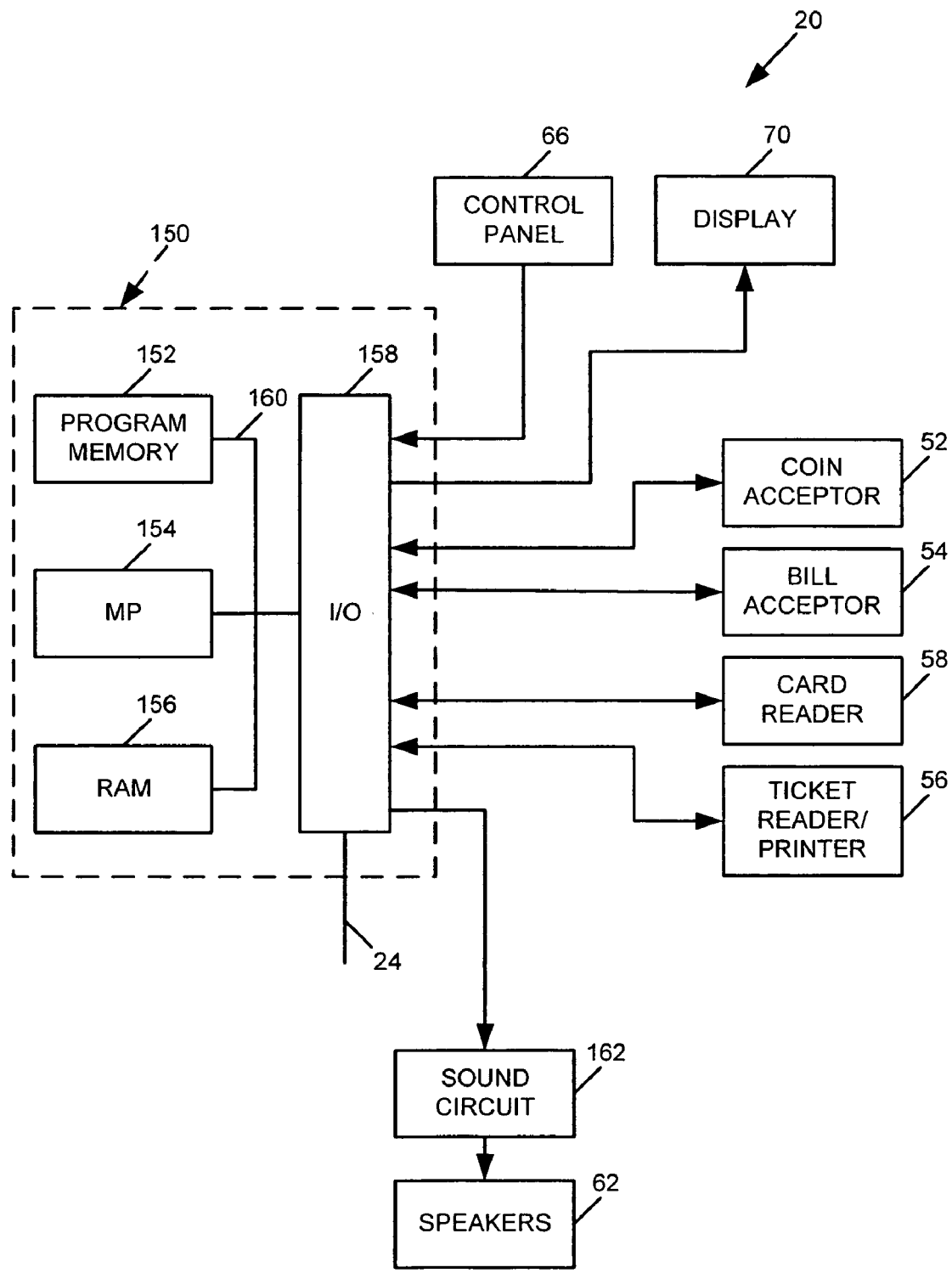
FIG. 12 is a block diagram of the electronic components of the gaming machine of FIG. 5.
Figure 13:
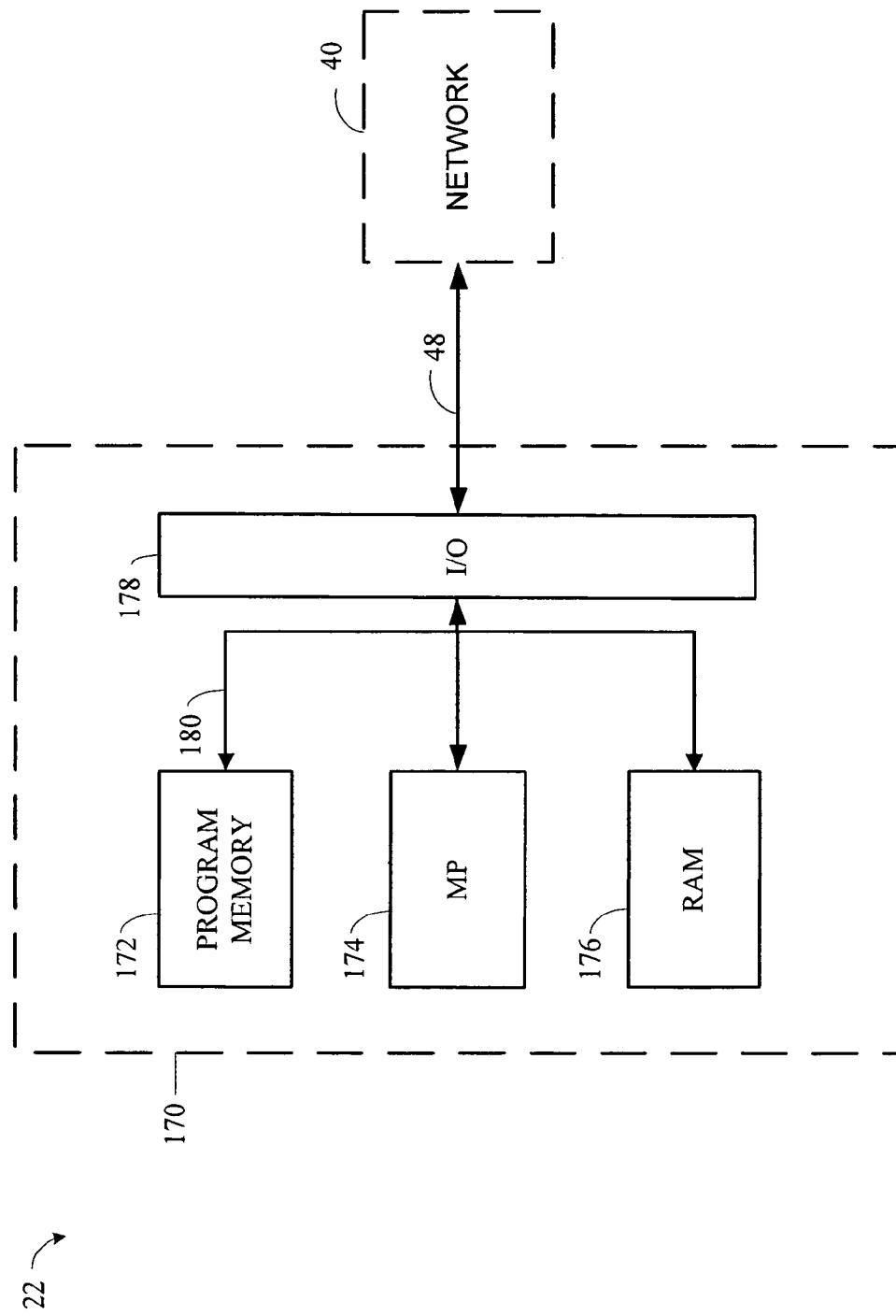
FIG. 13 is a block diagram of the electronic components of the network computer of FIG. 4.

FIG. 12 is a block diagram of a number of components that may be incorporated in the gaming machine 20. Referring to FIG. 12, the gaming machine 20 may include a controller 150 that may comprise a program memory 152, a microcontroller or microprocessor (MP) 154, a random-access memory (RAM) 156 and an input/output (I/O) circuit 158, all of which may be interconnected via an address/data bus 160. It should be appreciated that although only one microprocessor 154 is shown, the controller 150 may include multiple microprocessors 154. Similarly, the memory of the controller 150 may include multiple RAMs 156 and multiple program memories 152. Although the I/O circuit 158 is shown as a single block, it should be appreciated that the I/O circuit 158 may include a number of different types of I/O circuits. The RAM(s) 154 and program memories 152 may be implemented as semiconductor memories, magnetically readable memories, and/or optically readable memories, for example.

Although the program memory 152 is shown in FIG. 12 as a read-only memory (ROM) 152, the program memory of the controller 150 may be a read/write or alterable memory, such as a hard disk. In the event a hard disk is used as a program memory, the address/data bus 160 shown schematically in FIG. 12 may comprise multiple address/data buses, which may be of different types, and there may be an I/O circuit disposed between the address/data buses.

FIG. 12 illustrates that the control panel 66, the coin acceptor 52, the bill acceptor 54, the card reader 58 and the ticket reader/printer 56 may be operatively coupled to the I/O circuit 158, each of those components being so coupled by either a unidirectional or bidirectional, single-line or multiple-line data link, which may depend on the design of the component that is used. The speaker(s) 62 may be operatively coupled to a sound circuit 162, that may comprise a voice- and sound-synthesis circuit or that may comprise a driver circuit. The sound-generating circuit 162 may be coupled to the I/O circuit 158.

As shown in FIG. 12, the components 52, 54, 56, 58, 66, 162 may be connected to the I/O circuit 158 via a respective direct line or conductor. Different connection schemes could be used. For example, one or more of the components shown in FIG. 12 may be connected to the I/O circuit 158 via a common bus or other data link that is shared by a number of components. Furthermore, some of the components may be directly connected to the microprocessor 154 without passing through the I/O circuit 158.

Figure 20:
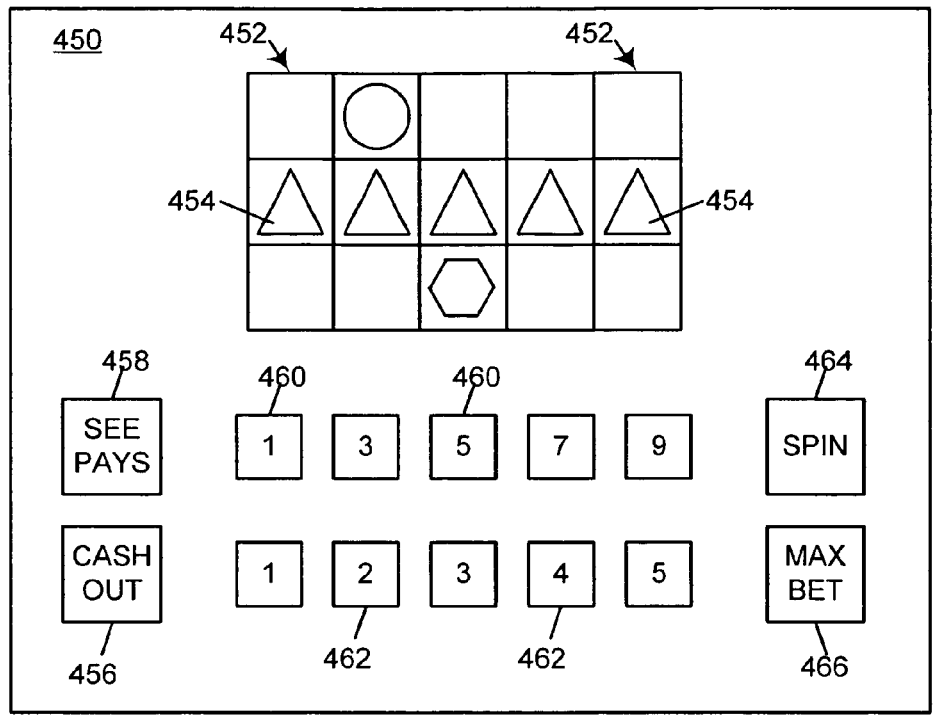
FIG. 20 is an illustration of an embodiment of a visual display that may be displayed during performance of the slots routine of FIG. 22.

FIG. 20 is a block diagram of a number of components that may be incorporated in the network computer 22. Referring to FIG. 20, the network computer 22 may include a controller 170 that may comprise a program memory 172, a microcontroller or microprocessor (MP) 174, a random-access memory (RAM) 176 and an input/output (I/O) circuit 178, all of which may be interconnected via an address/data bus 180. As with the controller 150, it should be appreciated that although only one microprocessor 174 is shown, the controller 170 may include multiple microprocessors 174. Similarly, the memory of the controller 170 may include multiple RAMs 176 and multiple program memories 172. Although the I/O circuit 178 is shown as a single block, it should be appreciated that the I/O circuit 178 may include a number of different types of I/O circuits. The RAM(s) 176 and program memories 172 may be implemented as semiconductor memories, magnetically readable memories, and/or optically readable memories, for example.

Although the program memory 172 is shown in FIG. 20 as a read-only memory (ROM) 172, the program memory of the controller 170 may be a read/write or alterable memory, such as a hard disk. In the event a hard disk is used as a program memory, the address/data bus 180 shown schematically in FIG. 20 may comprise multiple address/data buses, which may be of different types, and there may be an I/O circuit disposed between the address/data buses. Furthermore, the controller 170 is operatively coupled to the network 40 via the link 24.

Gaming Machine Electronics

FIG. 12 is a block diagram of a number of components that may be incorporated in the gaming machine 20. Referring to FIG. 12, the gaming machine 20 may include a controller 150 that may comprise a program memory 152, a microcontroller or microprocessor (MP) 154, a random-access memory (RAM) 156 and an input/output (I/O) circuit 158, all of which may be interconnected via an address/data bus 160. It should be appreciated that although only one microprocessor 154 is shown, the controller 150 may include multiple microprocessors 154. Similarly, the memory of the controller 150 may include multiple RAMs 156 and multiple program memories 152. Although the I/O circuit 158 is shown as a single block, it should be appreciated that the I/O circuit 158 may include a number of different types of I/O circuits. The RAM(s) 154 and program memories 152 may be implemented as semiconductor memories, magnetically readable memories, and/or optically readable memories, for example.

Although the program memory 152 is shown in FIG. 12 as a read-only-memory (ROM) 152, the program memory of the controller 150 may be a read/write or alterable memory, such as a hard disk. In the event a hard disk is used as a program memory, the address/data bus 160 shown schematically in FIG. 12 may comprise multiple address/data buses, which may be of different types, and there may be an I/O circuit disposed between the address/data buses.

FIG. 12 illustrates that the control panel 66, the coin acceptor 52, the bill acceptor 54, the card reader 58 and the ticket reader/printer 56 may be operatively coupled to the I/O circuit 158, each of those components being so coupled by either a unidirectional or bidirectional, single-line or multiple-line data link, which may depend on the design of the component that is used. The speaker(s) 62 may be operatively coupled to a sound circuit 162, that may comprise a voice- and sound-synthesis circuit or that may comprise a driver circuit. The sound-generating circuit 162 may be coupled to the I/O circuit 158.

As shown in FIG. 12, the components 52, 54, 56, 58, 66, 162 may be connected to the I/O circuit 158 via a respective direct line or conductor. Different connection schemes could be used. For example, one or more of the components shown in FIG. 12 may be connected to the I/O circuit 158 via a common bus or other data link that is shared by a number of components. Furthermore, some of the components may be directly connected to the microprocessor 154 without passing through the I/O circuit 158.

FIG. 20 is a block diagram of a number of components that may be incorporated in the network computer 22. Referring to FIG. 20, the network computer 22 may include a controller 170 that may comprise a program memory 172, a microcontroller or microprocessor (MP) 174, a random-access memory (RAM) 176 and an input/output (I/O) circuit 178, all of which may be interconnected via an address/data bus 180. As with the controller 150, it should be appreciated that although only one microprocessor 174 is shown, the controller 170 may include multiple microprocessors 174. Similarly, the memory of the controller 170 may include multiple RAMs 176 and multiple program memories 172. Although the I/O circuit 178 is shown as a single block, it should be appreciated that the I/O circuit 178 may include a number of different types of I/O circuits. The RAM(s) 176 and program memories 172 may be implemented as semiconductor memories, magnetically readable memories, and/or optically readable memories, for example.

Although the program memory 172 is shown in FIG. 20 as a read-only memory (ROM) 172, the program memory of the controller 170 may be a read/write or alterable memory, such as a hard disk. In the event a hard disk is used as a program memory, the address/data bus 180 shown schematically in FIG. 20 may comprise multiple address/data buses, which may be of different types, and there may be an I/O circuit disposed between the address/data buses. Furthermore, the controller 170 is operatively coupled to the network 40 via the link 24.

Overall Operation of Gaming Machine

One manner in which one or more of the gaming machines 20 (and one or more of the gaming machines 30) may operate is described below in connection with a number of flowcharts which represent a number of portions or routines of one or more computer programs, which may be stored in one or more of the memories of the controller 150. The computer program(s) or portions thereof may be stored remotely, outside of the gaming machine 20, and may control the operation of the gaming machine 20 from a remote location. Such remote control may be facilitated with the use of a wireless connection, or by an Internet interface that connects the gaming machine 20 with a remote computer (such as one of the network computers 22, 32) having the memory 172 in which the computer program portions are stored. The computer program portions may be written in any high level language such as C, C++, C#, Java or the like or any low-level assembly or machine language. By storing the computer program portions therein, various portions of the memories 152, 156, 172, 176 are physically and/or structurally configured in accordance with computer program instructions.

Figure 14:
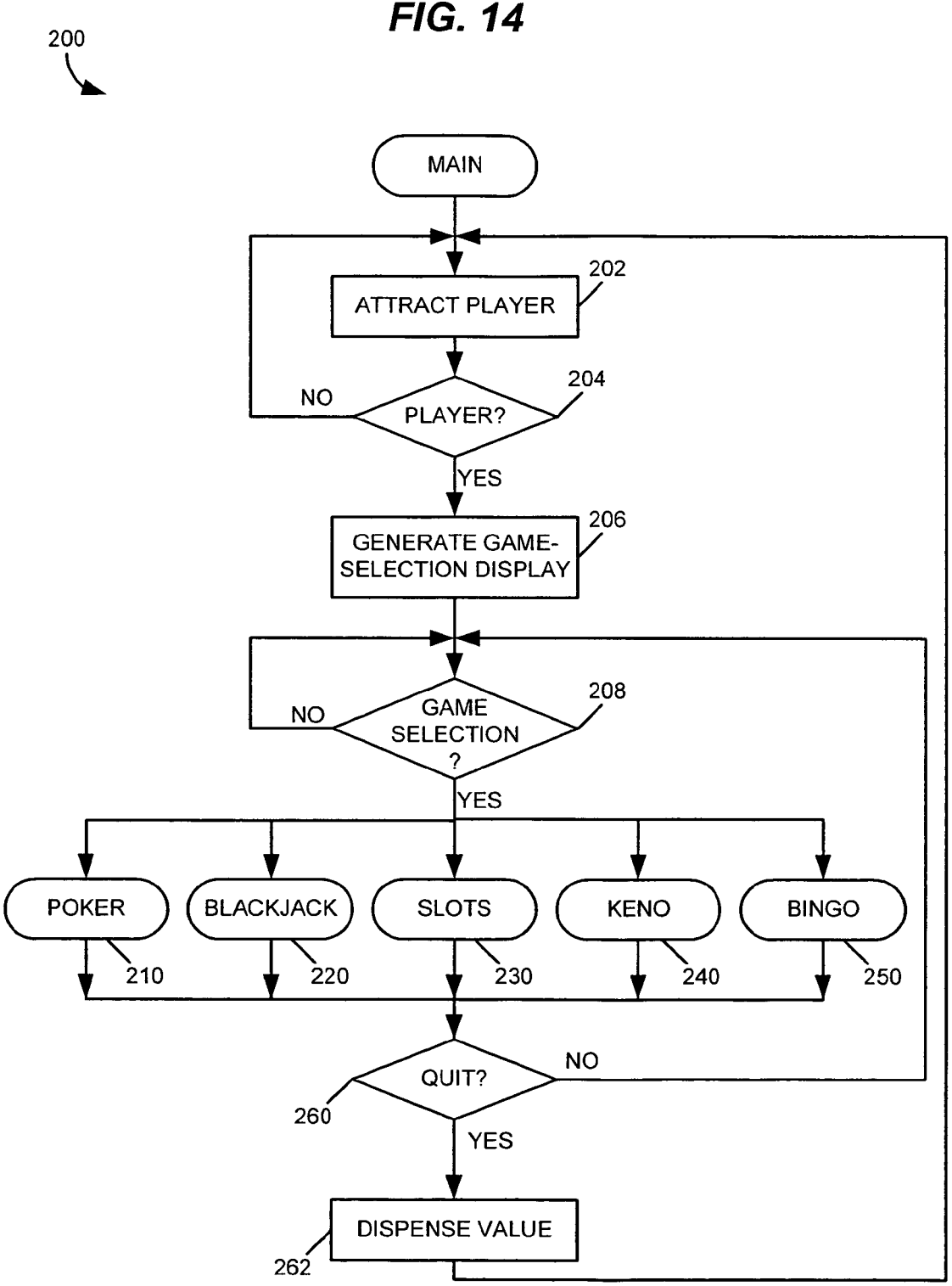
FIG. 14 is a block diagram of the electronic components of the network computer of FIG. 14.

FIG. 14 is a flowchart of a main operating routine 200 that may be stored in the memory of either the controller 150 or 170. Referring to FIG. 14, the main routine 200 may begin operation at block 202 during which an attraction sequence may be performed in an attempt to induce a potential player in a casino to play the gaming machine 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of games that may be played on the gaming machine 20 and/or video images of various games being played, such as video poker, video blackjack, video slots, video keno, video bingo, etc.

During performance of the attraction sequence, if a potential player makes any input to the gaming machine 20 as determined at block 204, the attraction sequence may be terminated and a game-selection display may be generated on the display unit 70 (if provided as a video display unit) at block 206 to allow the player to select a game available on the gaming machine 20. The gaming machine 20 may detect an input at block 204 in various ways. For example, the gaming machine 20 could detect if the player presses any button on the gaming machine 20; the gaming machine 20 could determine if the player deposited one or more coins into the gaming machine 20; the gaming machine 20 could determine if player deposited paper currency into the gaming machine; etc.

The game-selection display generated at block 206 may include, for example, a list of video games that may be played on the gaming machine 20 and/or a visual message to prompt the player to deposit value into the gaming machine 20. While the game-selection display is generated, the gaming machine 20 may wait for the player to make a game selection. Upon selection of one of the games by the player as determined at block 208, either the controller 150 or 170 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming machine 20 or to select another game. If the player wishes to stop playing the gaming machine 20, which wish may be expressed, for example, by selecting a "Cash Out" button, either the controller 150 or 170 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 14, a different number of routines could be included to allow play of a different number of games. The gaming machine 20 may also be programmed to allow play of different games.

Figure 15:
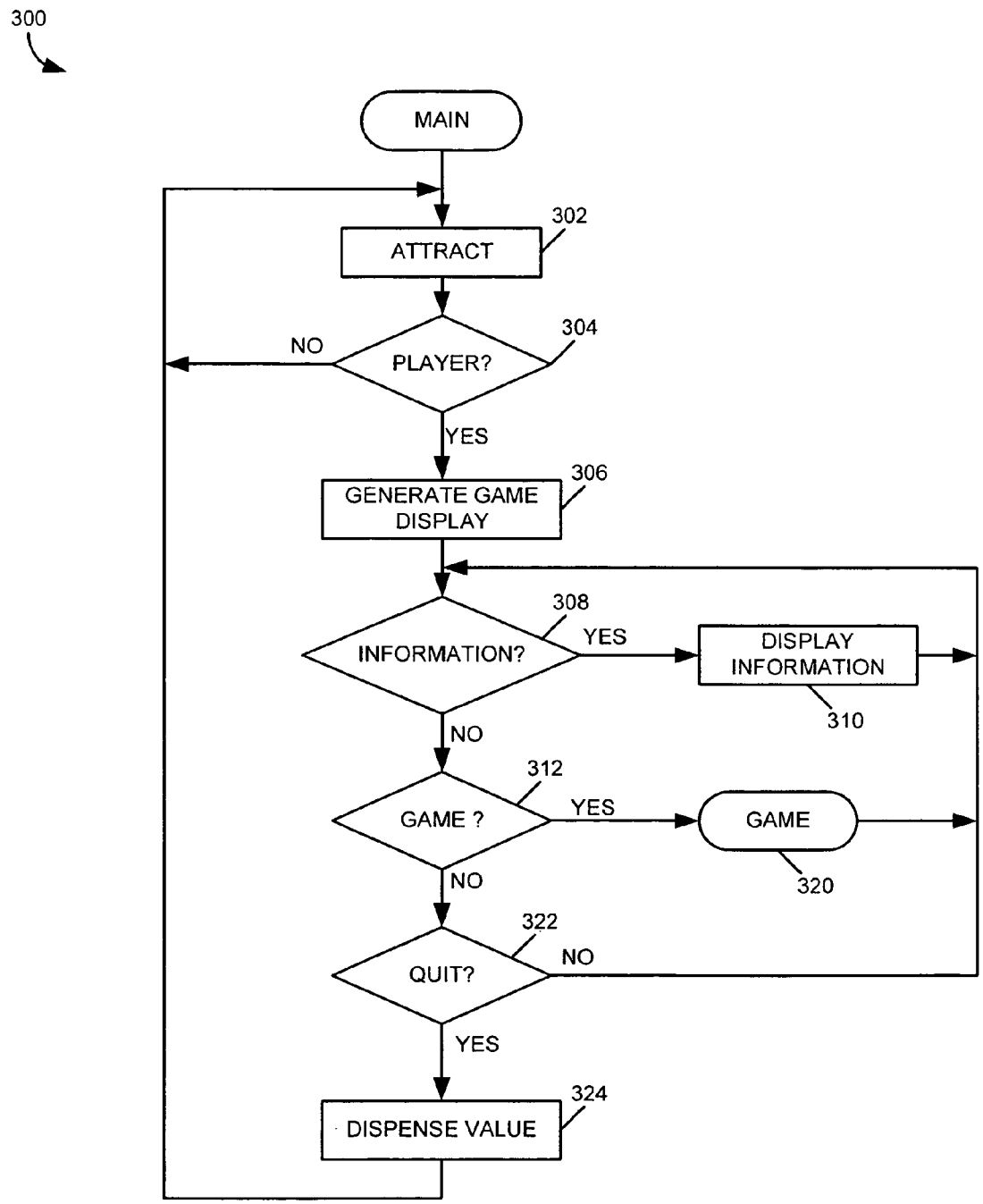
FIG. 15 is a flowchart of an alternative embodiment of a main routine that may be performed during operation of one or more of the gaming machines.

FIG. 15 is a flowchart of an alternative main operating routine 300 that may be stored in the memory of either the controller 150 or 170. The main routine 300 may be utilized for gaming machines 20 that are designed to allow play of only a single game or single type of game. Referring to FIG. 15, the main routine 300 may begin operation at block 302 during which an attraction sequence may be performed in an attempt to induce a potential player in a casino to play the gaming machine 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming machine 20 as determined at block 304, the attraction sequence may be terminated and a game display may be generated on the display unit 70 (if provided as a video display unit) at block 306. The game display generated at block 306 may include, for example, an image of the casino game that may be played on the gaming machine 20 and/or a visual message to prompt the player to deposit value into the gaming machine 20. At block 308, the gaming machine 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming machine 20. If the player wishes to stop playing the gaming machine 20, which wish may be expressed, for example, by selecting a "Cash Out" button, either the controller 150 or 170 may dispense value to the player at block 324 based on the outcome of the game(s) played by the player. The operation may then return to block 302. If the player did not wish to quit as determined at block 322, the operation may return to block 308.

Figure 16:
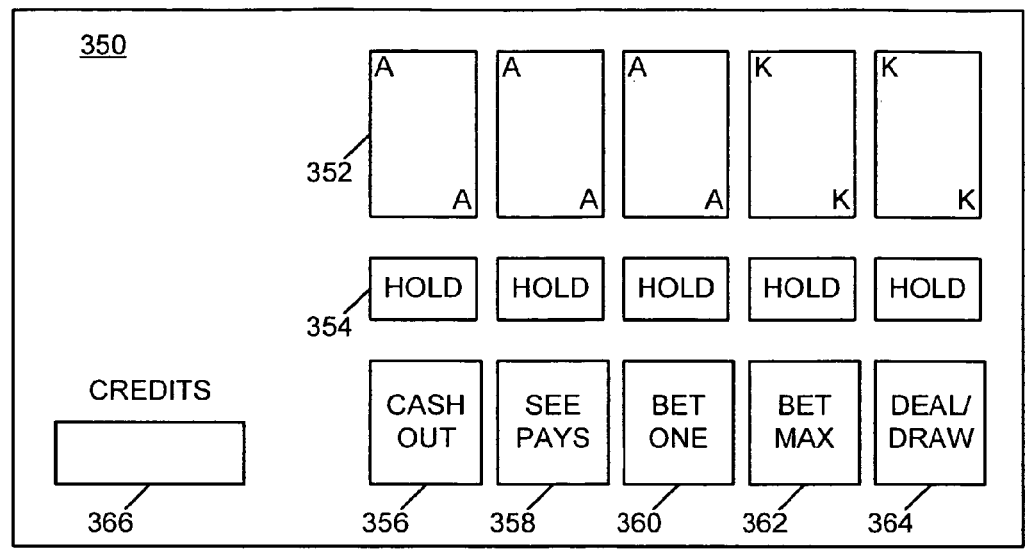
FIG. 16 is an illustration of an embodiment of a visual display that may be displayed during performance of the video poker routine of FIG. 18.

Video Poker

Where the gaming machine 20 is designed to facilitate play of a video poker game, the display unit 70 may comprise a video display unit. FIG. 16 is an exemplary display 350 that may be shown on the display unit 70 during performance of the video poker routine 210 shown schematically in FIG. 14. Referring to FIG. 16, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 18:
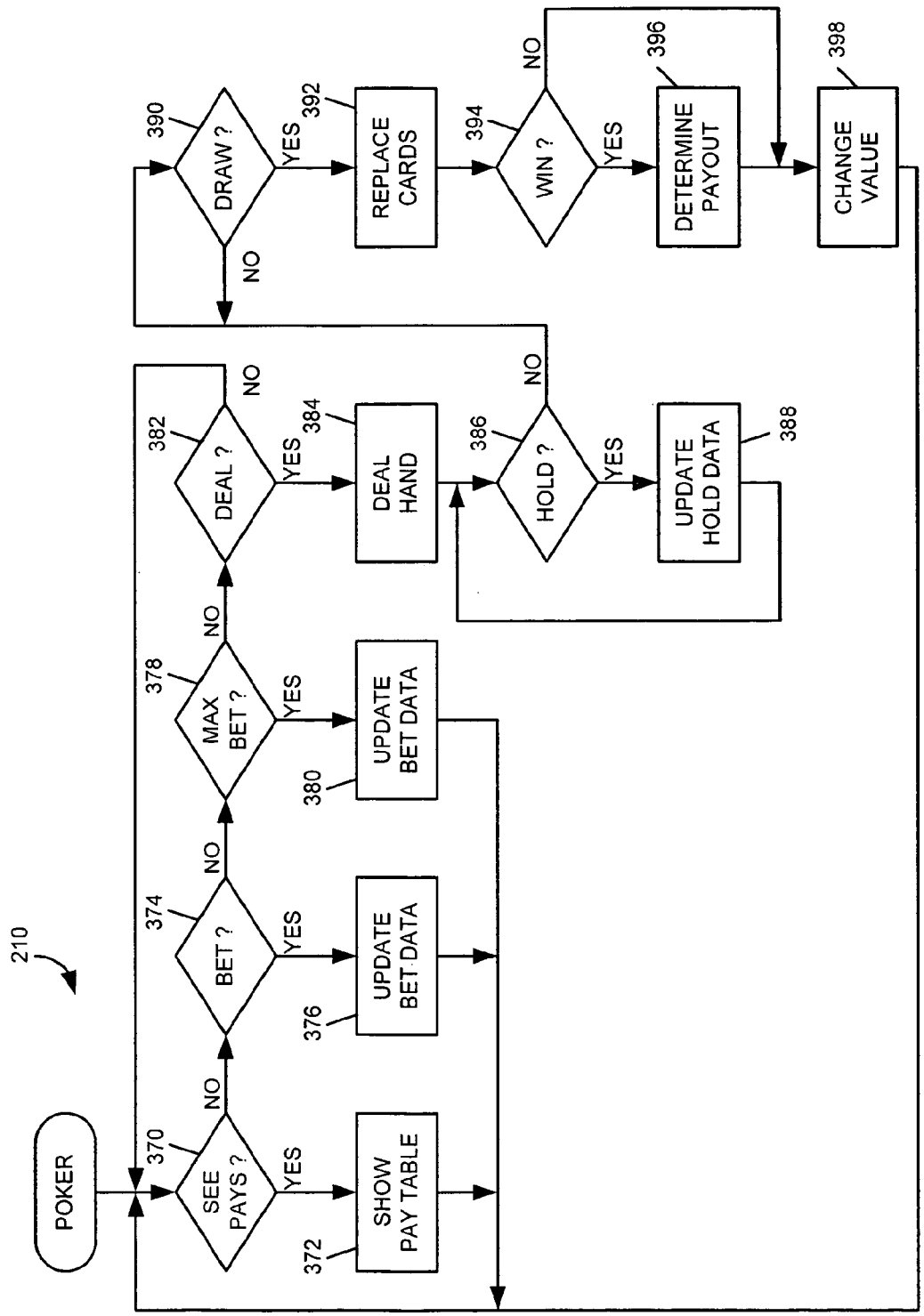
FIG. 18 is a flowchart of an embodiment of a video poker routine that may be performed by one or more of the gaming machines.

FIG. 18 is a flowchart of the video poker routine 210 shown schematically in FIG. 14. Referring to FIG. 18, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of either the controller 150 or 170. At block 378, the routine may determine whether the player has pressed the "Bet Max Credits" button 362, in which case at block 380 bet data corresponding to the maximum allowable bet may be stored in the memory of either the controller 150 or 170.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 150 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of either the controller 150 or 170. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 16).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 17:
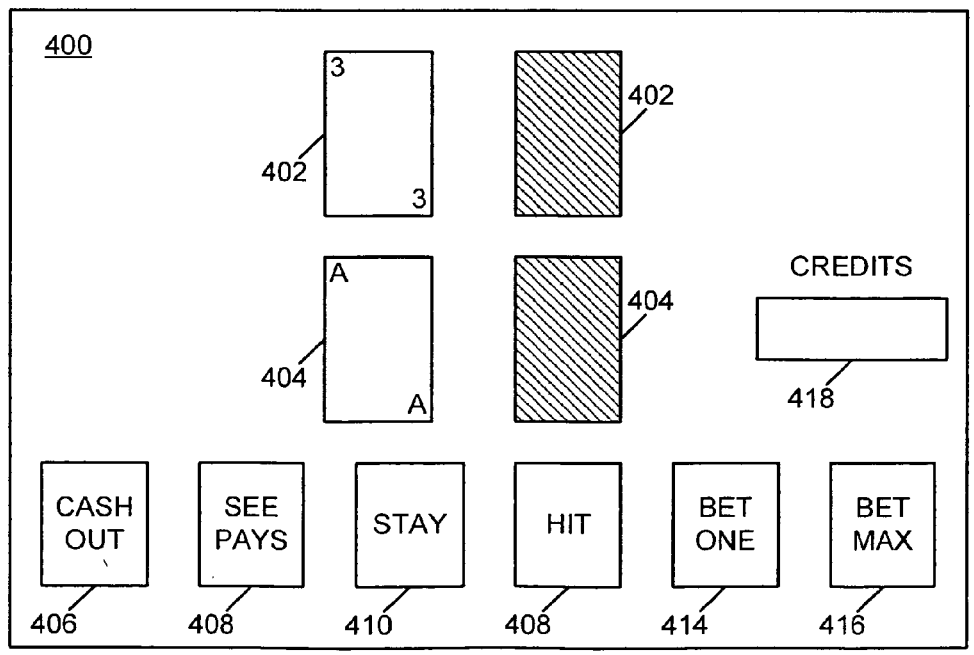
FIG. 17 is an illustration of an embodiment of a visual display that may be displayed during performance of the video blackjack routine of FIG. 19.

Video Blackjack

Where the gaming machine 20 is designed to facilitate play of a video blackjack game, the display unit 70 may comprise a video display unit. FIG. 17 is an exemplary display 400 that may be shown on the display unit 70 during performance of the video blackjack routine 220 shown schematically in FIG. 14. Referring to FIG. 17, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming machine 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 19:
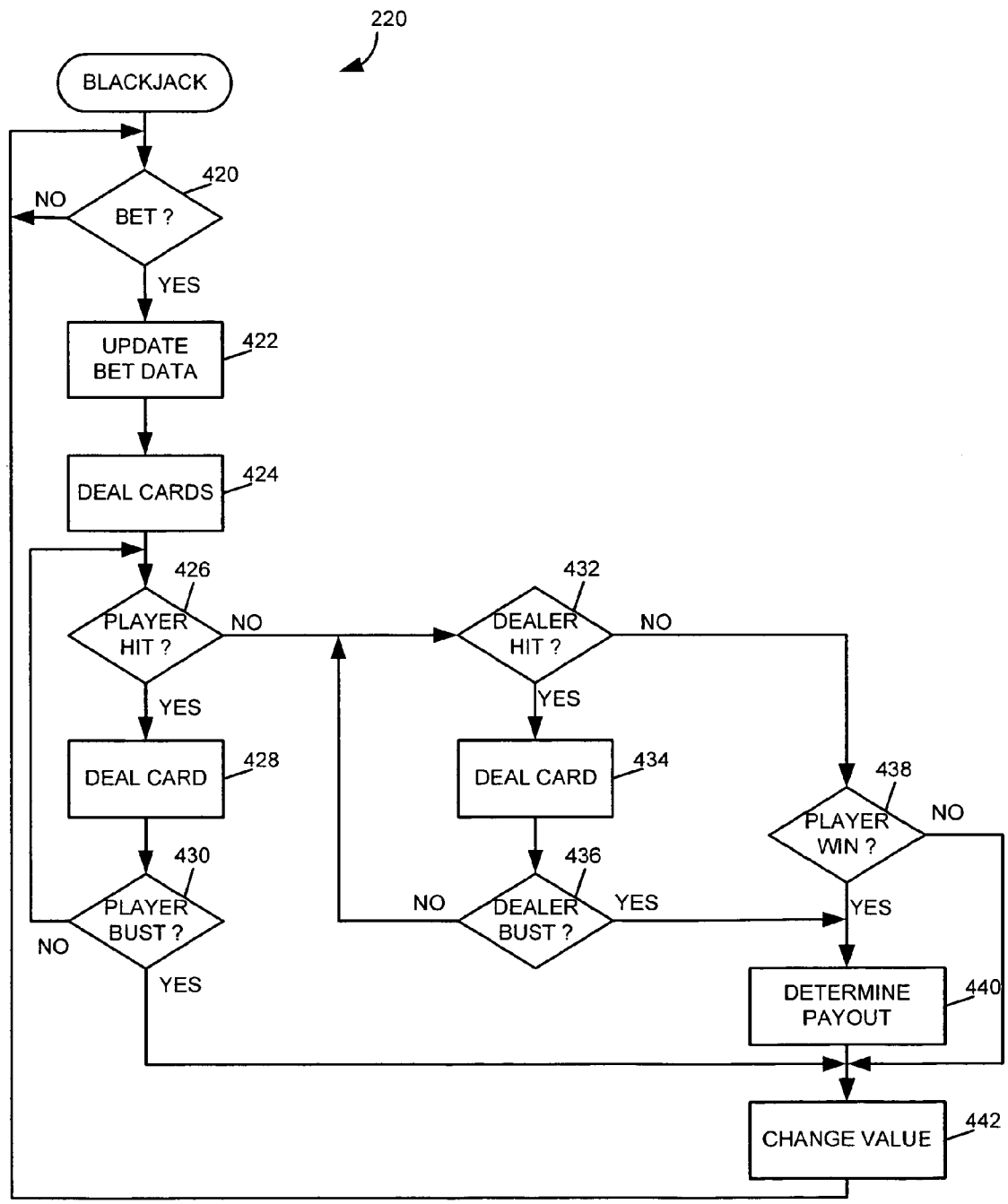
FIG. 19 is a flowchart of an embodiment of a video blackjack routine that may be performed by one or more of the gaming machines.

FIG. 19 is a flowchart of the video blackjack routine 220 shown schematically in FIG. 14. Referring to FIG. 19, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of either the controller 150 or 170. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 17).

Slots

Where the gaming machine 20 is designed to facilitate play of a video slots game, the display unit 70 may comprise a video display unit. FIG. 20 is an exemplary display 450 that may be shown on the display unit 70 during performance of the slots routine 230 shown schematically in FIG. 14. Referring to FIG. 20, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 22:
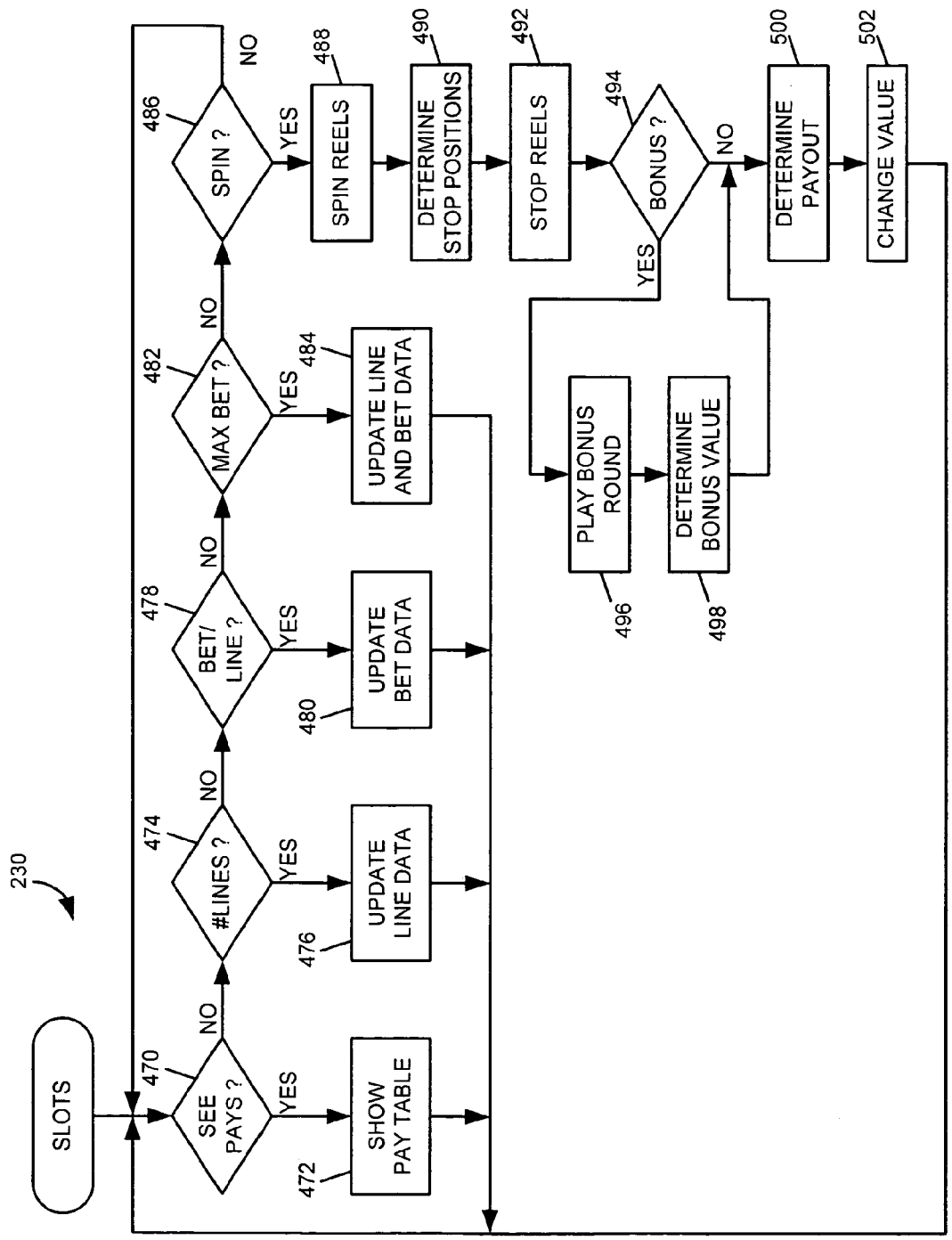
FIG. 22 is a flowchart of an embodiment of a slots routine that may be performed by one or more of the gaming machines.

FIG. 22 is a flowchart of the slots routine 230 shown schematically in FIG. 20. Referring to FIG. 22, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of either the controller 150 or 170. At block 478, the routine may determine whether the player has pressed one of the bet-selection buttons 462, in which case at block 480 data corresponding to the amount bet per payline may be stored in the memory of the controller 150. At block 482, the routine may determine whether the player has pressed the "Max Bet" button 466, in which case at block 484 bet data (which may include both payline data and bet-per-payline data) corresponding to the maximum allowable bet may be stored in the memory of either the controller 150 or 170.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon and being at least partially visible to a player.

Figure 21:
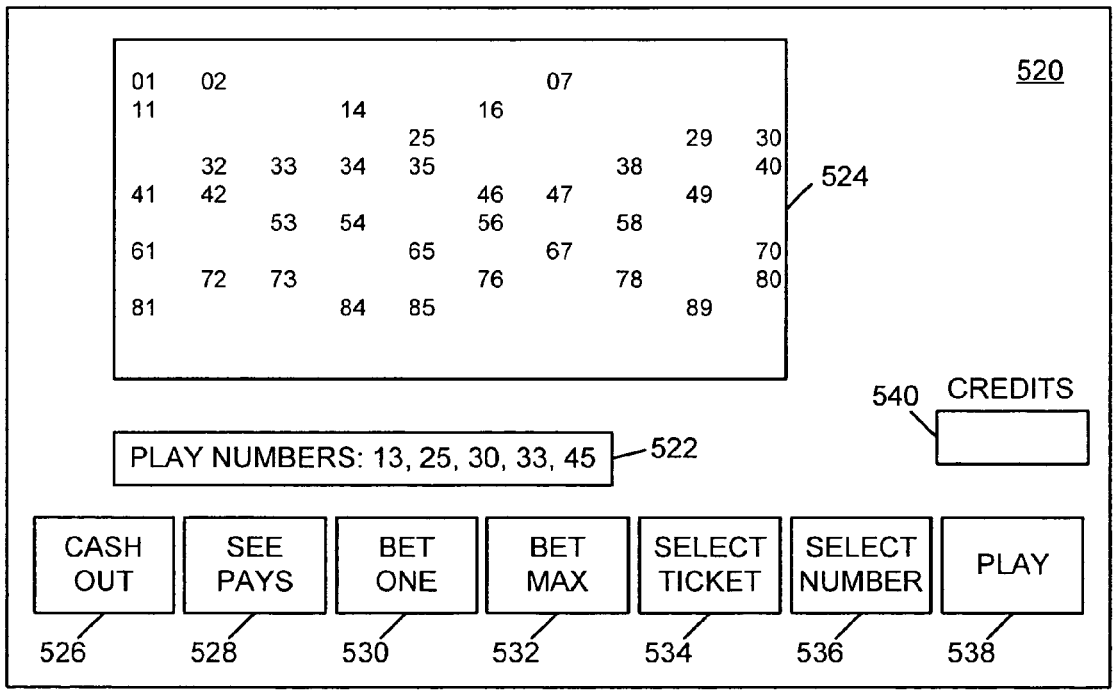
FIG. 21 is an illustration of an embodiment of a visual display that may be displayed during performance of the video keno routine of FIG. 23.

Video Keno

Where the gaming machine 20 is designed to facilitate play of a video keno game, the display unit 70 may comprise a video display unit. FIG. 21 is an exemplary display 520 that may be shown on the display unit 70 during performance of the video keno routine 240 shown schematically in FIG. 14. Referring to FIG. 21, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 23:
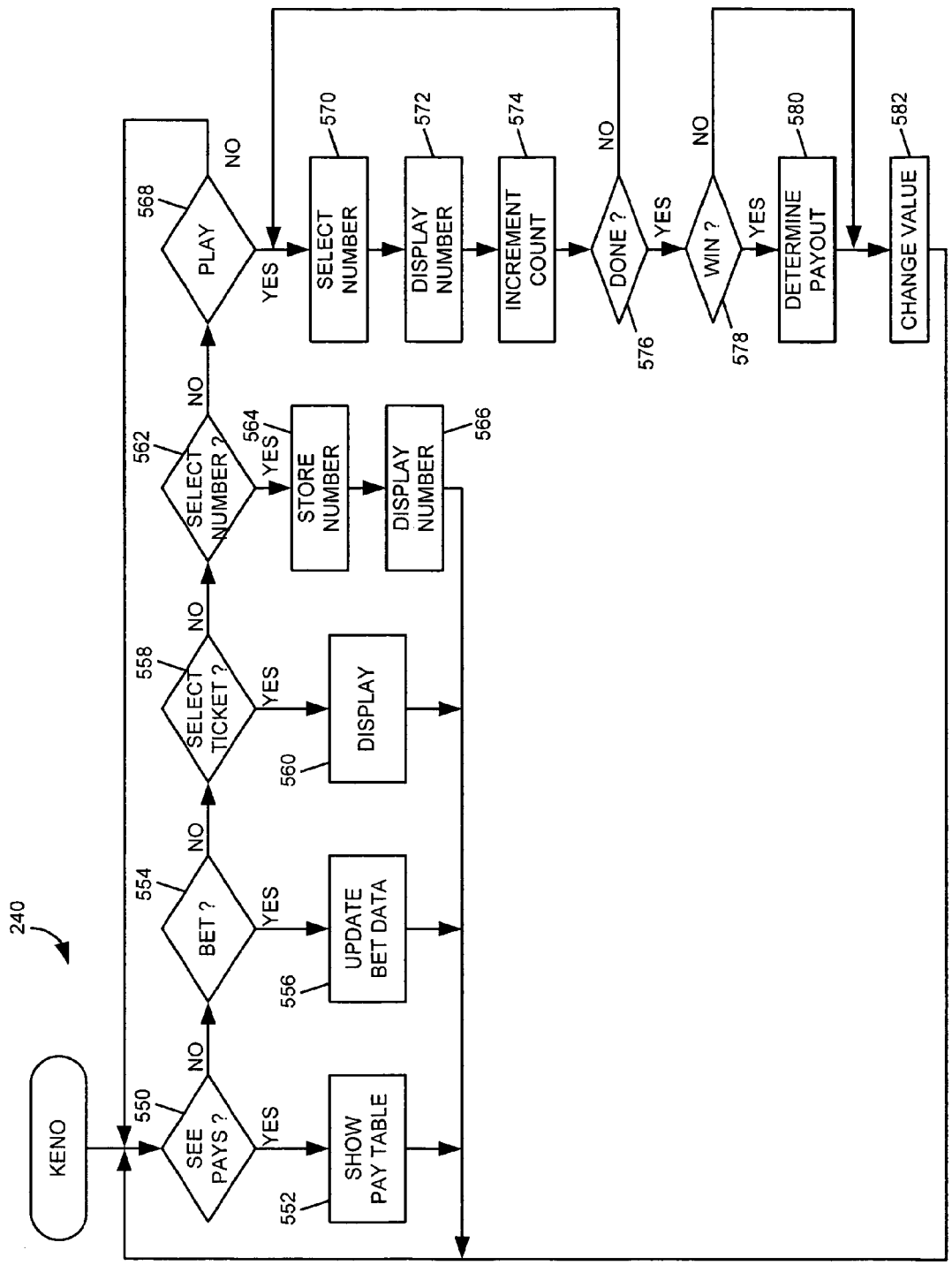
FIG. 23 is a flowchart of an embodiment of a video keno routine that may be performed by one or more of the gaming machines.

FIG. 23 is a flowchart of the video keno routine 240 shown schematically in FIG. 14. The keno routine 240 may be utilized in connection with a single gaming machine 20 where a single player is playing a keno game, or the keno routine 240 may be utilized in connection with multiple gaming machines 20 where multiple players are playing a single keno game. In the latter case, one or more of the acts described below may be performed either by the controller 150 in each gaming machine or by one of the network computer 22, 32 to which multiple gaming machines 20 are operatively connected.

Referring to FIG. 23, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of either the controller 150 or 170. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of either the controller 150 or 170 at block 564 and may be included in the image 522 on the display 520 at block 566. After a certain amount of time, the keno game may be closed to additional players (where a number of players are playing a single keno game using multiple gambling machines 20).

If play of the keno game is to begin as determined at block 568, at block 570 a game number within a range set by the casino may be randomly selected either by the controller 150 or a central computer operatively connected to the controller, such as one of the network computers 22, 32. At block 572, the randomly selected game number may be displayed on the display unit 70 and the display units 70 of other gaming machines 20 (if any) which are involved in the same keno game. At block 574, the controller 150 (or the central computer noted above) may increment a count which keeps track of how many game numbers have been selected at block 570.

At block 576, the controller 150 (or one of the network computers 22, 32) may determine whether a maximum number of game numbers within the range have been randomly selected. If not, another game number may be randomly selected at block 570. If the maximum number of game numbers has been selected, at block 578 the controller 150 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 21).

Figure 24:
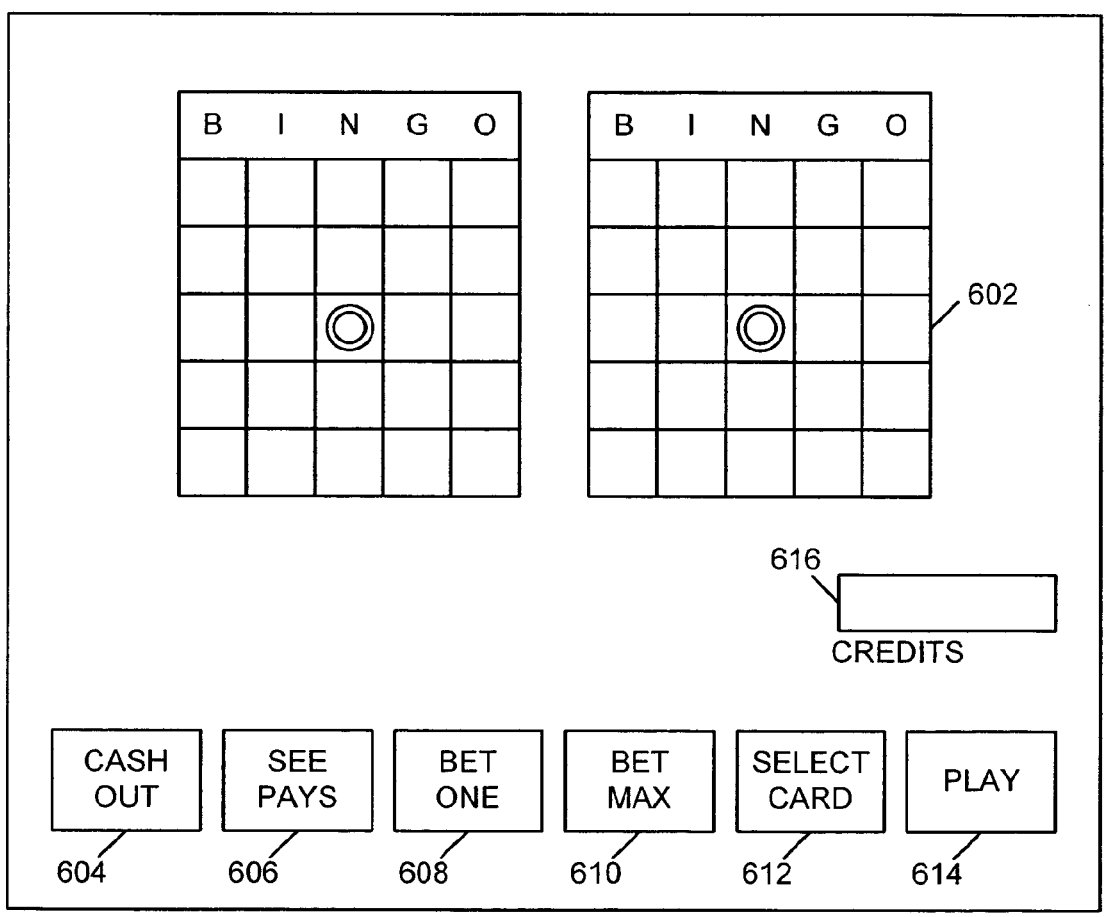
FIG. 24 is an illustration of an embodiment of a visual display that may be displayed during performance of the video bingo routine of FIG. 25.

Video Bingo

Where the gaming machine 20 is designed to facilitate play of a video bingo game, the display unit 70 may comprise a video display unit. FIG. 24 is an exemplary display 600 that may be shown on the display unit 70 during performance of the video bingo routine 250 shown schematically in FIG. 14. Referring to FIG. 24, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 25:
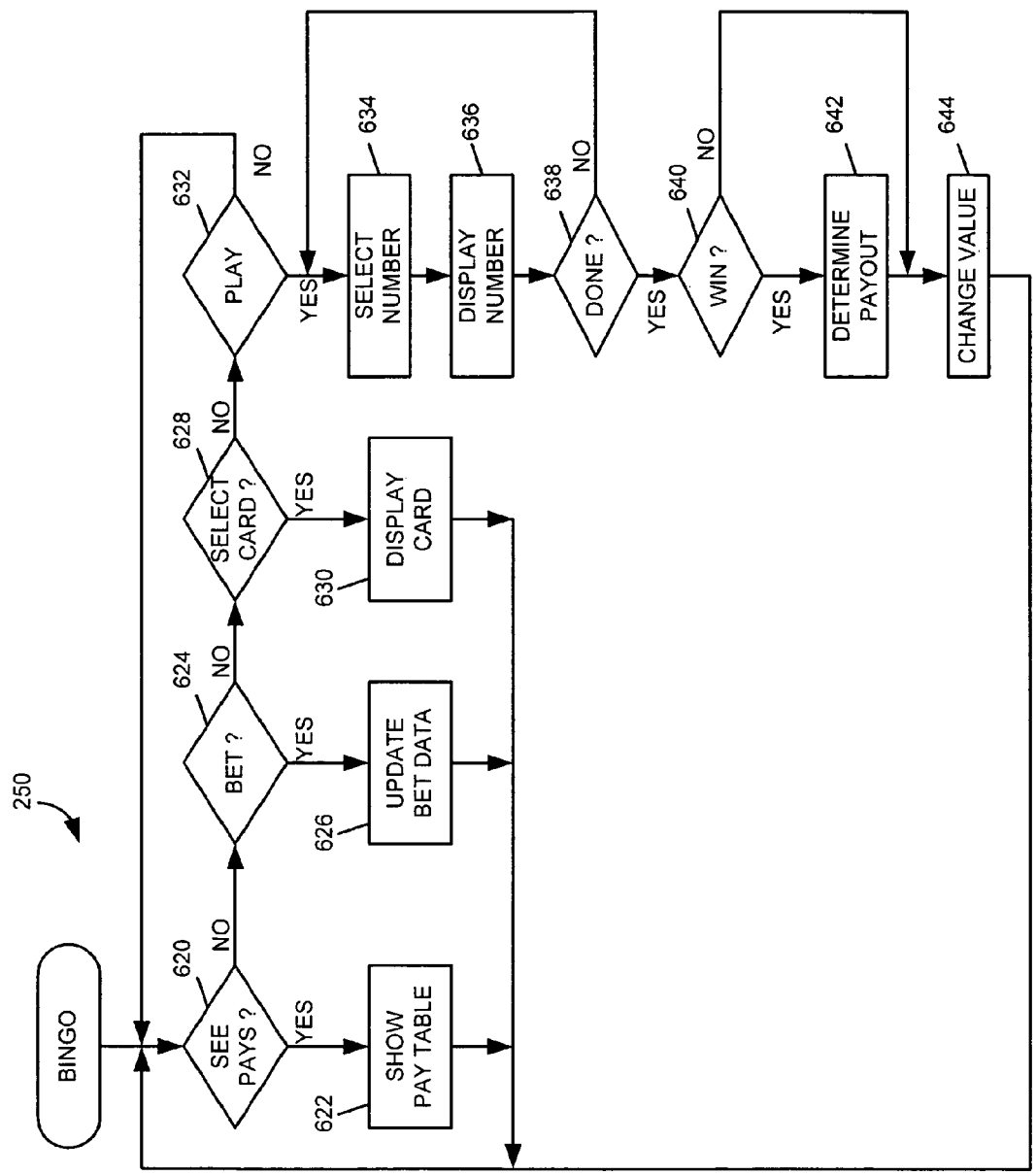
FIG. 25 is a flowchart of an embodiment of a video bingo routine that may be performed by one or more of the gaming machines.

FIG. 25 is a flowchart of the video bingo routine 250 shown schematically in FIG. 14. The bingo routine 250 may be utilized in connection with a single gaming machine 20 where a single player is playing a bingo game, or the bingo routine 250 may be utilized in connection with multiple gaming machines 20 where multiple players are playing a single bingo game. In the latter case, one or more of the acts described below may be performed either by the controller 150 in each gaming machine 20 or by one of the network computers 22, 32 to which multiple gaming machines 20 are operatively connected.

Referring to FIG. 25, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 150.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 150 or a central computer such as one of the network computers 22, 32. At block 636, the bingo number may be displayed on the display unit 70 and the display units 70 of any other gaming machines 20 involved in the bingo game.

At block 638, the controller 150 (or a central computer) may determine whether any player has won the bingo game. If no player has won, another bingo number may be randomly selected at block 634. If any player has bingo as determined at block 638, the routine may determine at block 640 whether the player playing that gaming machine 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 24).

What is claimed is:

1. A method of operating a gaming system including a plurality of instructions stored by a memory device of at least one network computer, said plurality of instructions executable by the at least one network computer, said method comprising:

causing the at least one network computer to execute the plurality of instructions to receive information relating to a monetary average machine net win in monetary units per casino gaming machine per unit of time for a group of existing casino gaming machines located on a gaming floor of a casino, said monetary average machine net win being calculated by dividing a total net win amount for a first time period at all of said existing casino gaming machines in said group by a total number of said existing casino gaming machines in said group of casino gaming machines, said total net win amount equaling a total coin-in amount for all of said existing casino gaming machines in said group minus a total paid out amount for all of said existing casino gaming machines in said group and minus any amounts escrowed for any future jackpot or award and each of said existing casino gaming machines being associated with at least one game having gaming content, at least one denomination, and a payout table including a plurality of outcomes and a plurality of value payouts associated with the outcomes;

causing the at least one network computer to execute the plurality of instructions to receive information relating to a lease percentage for a second time period, said second time period being subsequent to the first time period, said lease percentage based, at least in part, on the monetary average machine net win calculated based on the total net win amount for the first time period, said lease percentage being less than 10% and greater than 0.1%;

for a leased gaming device leased to said casino by a supplier for the second time period, causing the at least one network computer to execute the plurality of instructions to determine a monetary payment amount for said second time period, said leased gaming device being associated with at least one game having gaming content, at least one denomination and a payout table including a plurality of outcomes and a plurality of value payouts associated with the outcomes, said monetary payment amount being equal to the lease percentage of a total coin-in amount for said leased casino gaming machine for said second time period and said monetary payment being determined: (i) regardless of any differences between the gaming content of any game of any of the existing casino gaming machines and the gaming content of the at least one game of the leased gaming device, (ii) regardless of any differences between the at least one denomination of any of the existing casino gaming machines and the at least one denomination of the leased gaming device, and (iii) regardless of any differences between the payout table of any of the existing casino gaming machines and the payout table of the leased gaming device; and causing the at least one network computer to execute the plurality of instructions to transmit information about said determined monetary payment amount for said second time period for said leased casino gaming machine to facilitate payment of said determined monetary payment amount from the casino to the supplier.

2. A method as defined in claim 1, comprising the step of causing the at least one network computer to execute the plurality of instructions to adjust said monetary payment amount if a leased machine net win amount is determined to be less than said average machine net win, said leased machine net win amount equaling said total coin-in amount at said leased gaming machine for said second time period minus a total amount paid out to all players playing at said leased gaming machine over said second time period and minus any amounts escrowed for a future jackpot or award for the second time period.

3. A method as defined in claim 2, comprising causing the at least one network computer to execute the plurality of instructions to decrease said lease percentage when said leased machine net win amount is less than said average machine net win.

4. A method as defined in claim 1, further comprising causing the at least one network computer to execute the plurality of instructions to subtract an additional monetary amount from said total coin-in amount at said leased gaming machine for said second time period in determining said monetary payment amount.

5. A method as defined in claim 1, wherein said lease percentage is a variable percentage.

6. A method as defined claim 1, comprising causing the at least one network computer to execute the plurality of instructions to identify said group of existing gaming machines based on one of the following common characteristics: the denomination, a title, a theme, a math model, a common system connection, a common jackpot.

7. A method as defined in claim 1, comprising causing the at least one network computer to execute the plurality of instructions to identify said group of existing gaming machines based a geographic characteristic.

8. A method as defined in claim 7, comprising causing the at least one network computer to execute the plurality of instructions to identify said group of existing gaming machines based on one of the following geographic characteristics: at least one of a bank of casino gaming machines, at least one section of floor space, or an entire casino.

9. A method as defined in claim 1, comprising causing the at least one network computer to execute the plurality of instructions to determine that said same monetary payment amount is to be paid from said casino to said supplier, if a modification of the gaming content is provided to said leased casino gaming machine.

* * * * *